United States Patent
Mattison, Sr. et al.

(10) Patent No.: US 11,334,893 B1
(45) Date of Patent: May 17, 2022

(54) INTELLIGENT CASH HANDLING

(71) Applicant: Bank of America Corporation, Charlotte, NC (US)

(72) Inventors: Paul Martin Mattison, Sr., Sherrills Ford, NC (US); Matthew E. Williams, Little Elm, TX (US); Carl Parziale, Charlotte, NC (US); Pavan Singaraju, Waxhaw, NC (US); Anne Price, Newport, TN (US); David Smiddy, Chadds Ford, PA (US); Brandon Kozlowski, Charlotte, NC (US); Jennifer Raley, Mount Holly, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/317,796

(22) Filed: May 11, 2021

Related U.S. Application Data

(60) Provisional application No. 63/123,201, filed on Dec. 9, 2020.

(51) Int. Cl.
| | |
|---|---|
| *G06Q 20/40* | (2012.01) |
| *G06Q 20/32* | (2012.01) |
| *G07D 11/60* | (2019.01) |
| *G06Q 20/10* | (2012.01) |
| *G06Q 20/20* | (2012.01) |
| *G07D 11/32* | (2019.01) |

(52) U.S. Cl.
CPC ....... *G06Q 20/4014* (2013.01); *G06Q 20/102* (2013.01); *G06Q 20/1085* (2013.01); *G06Q 20/206* (2013.01); *G06Q 20/3223* (2013.01); *G06Q 20/3276* (2013.01); *G07D 11/32* (2019.01); *G07D 11/60* (2019.01)

(58) Field of Classification Search
None
See application file for complete search history.

(56) References Cited

U.S. PATENT DOCUMENTS

| | | |
|---|---|---|
| 2010/0205063 A1 | 8/2010 | Mersky |
| 2013/0060686 A1 | 3/2013 | Mersky |
| 2013/0085940 A1 | 4/2013 | O'Laughlin et al. |
| 2013/0110717 A1 | 5/2013 | Kobres |
| 2013/0124411 A1 | 5/2013 | Kobres et al. |

(Continued)

*Primary Examiner* — Kristy A Haupt
(74) *Attorney, Agent, or Firm* — Banner & Witcoff, Ltd.

(57) ABSTRACT

Aspects of the disclosure relate to cash handling devices that provide intelligent monitoring and management of cash cycles. A cash handling device having at least one processor, a communication interface, and memory may receive, from a mobile device, a request to process a pre-staged transaction. Subsequently, the cash handling device may generate and present a graphical identifier based on the mobile device requesting access to the cash handling device. Next, the cash handling device may verify that the mobile device is authorized to perform the pre-staged transaction based on the graphical identifier being scanned by the mobile device and cause a connection to be established between the cash handling device and the mobile device. Thereafter, the cash handling device may identify and process the pre-staged transaction associated with the mobile device. Then, the cash handling device may generate a notification indicating completed processing of the identified pre-staged transaction.

20 Claims, 21 Drawing Sheets

(56) References Cited

U.S. PATENT DOCUMENTS

| | | |
|---|---|---|
| 2013/0238497 A1 | 9/2013 | Ramachandran et al. |
| 2015/0278775 A1 | 10/2015 | Kosloski et al. |
| 2016/0014552 A1* | 1/2016 | Hanson ................ G06Q 20/108 |
| | | 455/456.3 |
| 2016/0063477 A1 | 3/2016 | Egan et al. |
| 2016/0267438 A1 | 9/2016 | Sobol et al. |
| 2016/0321627 A1 | 11/2016 | McCracken et al. |
| 2017/0132593 A1 | 5/2017 | Block et al. |
| 2017/0262823 A1 | 9/2017 | Hartung |
| 2017/0308883 A1 | 10/2017 | Black |
| 2018/0114207 A1 | 4/2018 | Budde et al. |
| 2018/0165663 A1* | 6/2018 | Naik ................. G06Q 20/3821 |
| 2018/0247275 A1 | 8/2018 | Petrov |
| 2018/0300698 A1 | 10/2018 | Block et al. |
| 2019/0295055 A1* | 9/2019 | Kuchenski ......... G06Q 20/1085 |
| 2019/0312882 A1 | 10/2019 | D'Agostino et al. |
| 2019/0318342 A1 | 10/2019 | Mushing et al. |
| 2019/0370780 A1 | 12/2019 | Monaghan |
| 2020/0327515 A1 | 10/2020 | McCarley et al. |
| 2020/0356979 A1 | 11/2020 | Dadhaniya et al. |
| 2020/0356981 A1 | 11/2020 | Sofronas |
| 2020/0364694 A1 | 11/2020 | Sofronas |
| 2020/0371819 A1 | 11/2020 | Carroll |
| 2021/0027295 A1 | 1/2021 | Raquepaw et al. |
| 2021/0042743 A1* | 2/2021 | Green ............. G06Q 20/38215 |

* cited by examiner

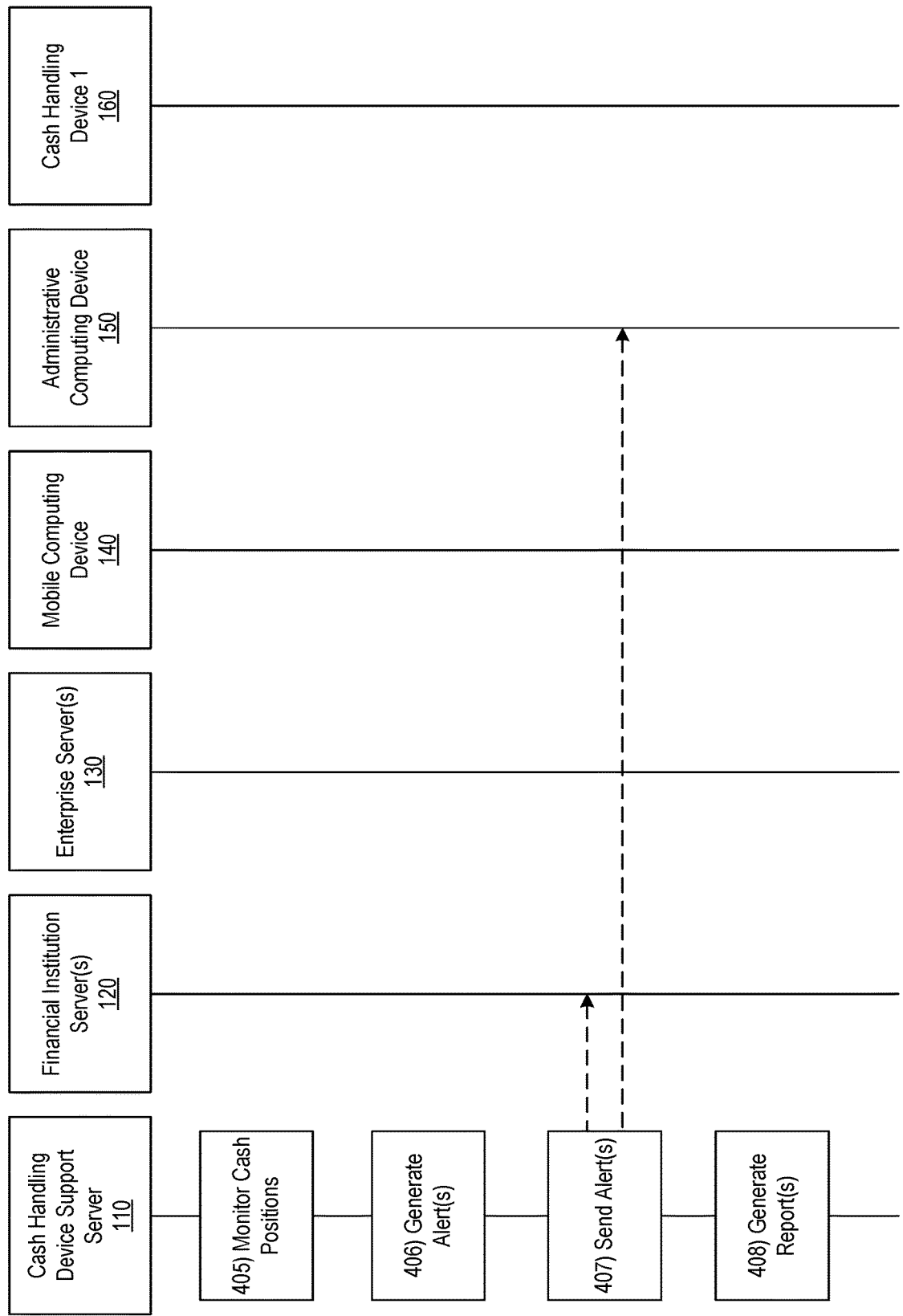

700

User Interface
*Mobile Computing Device*

How much cash do you need?

Amount 1...

Amount 2...

Amount 3...

Enter Different Amount ...

| Back | More Options ... | Next |

User Interface
*Mobile Computing Device*

Please scan QR code.

⌐  ¬

⌊  ⌋

Move device closer ...

Timer ...

| Back | | Next |

FIG. 8

INTELLIGENT CASH HANDLING

CROSS-REFERENCE TO RELATED APPLICATION(S)

This application is a non-provisional of and claims the benefit of priority to U.S. Patent Application Ser. No. 63/123,201, filed Dec. 9, 2020, and entitled "INTELLIGENT CASH HANDLING," which is hereby incorporated by reference in its entirety for all purposes.

BACKGROUND

Aspects of the disclosure relate to cash handling and servicing in a cash-centric environment. In particular, one or more aspects of the disclosure relate to deploying, configuring, and utilizing cash handling devices to provide intelligent monitoring and management of cash cycles.

For enterprises such as retail and financial institutions that often handle large quantities of paper cash every day, managing cash inventories has become increasingly difficult. In many instances, it may be important to provide a way to digitize cash transactions at a point of presentment such that physical cash may be managed more efficiently and effectively.

SUMMARY

Aspects of the disclosure provide effective, efficient, scalable, and convenient technical solutions that address and overcome the technical problems associated with optimizing the technical operations of cash handling devices and various related computer systems. In particular, one or more aspects of the disclosure provide techniques for deploying, configuring, and utilizing cash handling devices to provide intelligent monitoring and management of cash cycles.

In accordance with one or more embodiments, a cash handling device having at least one processor, a memory, and a communication interface may receive, from a mobile device, a request to process a pre-staged transaction. Subsequently, the cash handling device may generate and present a graphical identifier based on the mobile device requesting access to the cash handling device. Next, the cash handling device may verify that the mobile device is authorized to perform the pre-staged transaction based on the graphical identifier being scanned by the mobile device. Based on verifying that the mobile device is authorized to perform the pre-staged transaction, the cash handling device may cause a connection to be established between the cash handling device and the mobile device. Thereafter, the cash handling device may identify and process the pre-staged transaction associated with the mobile device. Then, the cash handling device may generate a notification indicating completed processing of the identified pre-staged transaction.

In accordance with one or more additional embodiments, a cash handling device having at least one processor, a communication interface, a small screen display, an item accepting and dispensing device, and a memory may present a graphical identifier on the small screen display. Subsequently, based on the graphical identifier being scanned by a mobile device, the cash handling device may capture authentication information. Then, the cash handling device may receive, via the communication interface, from the mobile device, a request to process a pre-staged transaction. Next, the cash handling device may verify that the mobile device is authorized to perform the pre-staged transaction based on the captured authentication information. After verifying that the mobile device is authorized to perform the pre-staged transaction based on the captured authentication information, the cash handling device may cause a connection to be established between the cash handling device and the mobile device and may activate the item accepting and dispensing device in an open position to accept or dispense cash in accordance with the pre-staged transaction. Thereafter, the cash handling device may receive or dispense cash, via the item accepting and dispensing device, in accordance with the pre-staged transaction. Then, the cash handling device may present a notification indicating completed processing of the pre-staged transaction.

In some embodiments, presenting the graphical identifier may include presenting a quick response (QR) code. In addition, the QR code may be used for a transaction between the mobile device and the cash handling device.

In some embodiments, verifying that the mobile device is authorized to perform the pre-staged transaction based on the captured authentication information may include verification using mobile authentication.

In some embodiments, receiving the request to process the pre-staged transaction may include receiving the request from a smartphone, associated with a user, executing an application associated with a financial institution. In some embodiments, receiving the request to process the pre-staged transaction may include receiving the request from a tablet computer, associated with a financial institution, executing an application associated with the financial institution.

In some embodiments, capturing the authentication information based on the graphical identifier being scanned by the mobile device may include identifying a user associated with the pre-staged transaction.

In some embodiments, causing a connection to be established between the cash handling device and the mobile device may include establishing a mobile network connection between the cash handling device and the mobile device.

In some embodiments, the cash handling device may verify that the mobile device is authorized to perform the pre-staged transaction based on additional authentication mechanisms including one or more of: one-time password, proximity-based authentication, or multifactor authentication.

In some embodiments, after activating the item accepting and dispensing device in an open position to accept or dispense cash in accordance with the pre-staged transaction, the cash handling device may present a notification associated with processing of the pre-staged transaction. In addition, the notification may consist of one or two words.

In accordance with one or more additional embodiments, a cash handling device, at a merchant location of a merchant and integrated with a point-of-sale terminal, having at least one processor, a communication interface, a small screen display, an item accepting device, and a memory may present a graphical identifier on the small screen display. Based on the graphical identifier being scanned by the mobile device of the merchant, the cash handling device may capture authentication information. Then, the cash handling device may receive, via a communication interface, from the mobile device of the merchant, a request to process a pre-staged transaction to deposit cash designated as payment to the merchant from a transaction at the point-of-sale terminal. Next, the cash handling device may verify that the mobile device of the merchant is authorized to perform the pre-staged transaction based on the captured authentication information. After verifying that the mobile device of the merchant is authorized to perform the pre-staged transaction based on the captured authentication information, the cash handling device may cause a connection to be established between the cash handling device and the mobile device of the merchant, and activate an item accepting device in an open position to accept cash for deposit into the cash handling device. Thereafter, the cash handling device may receive cash from the merchant in an amount specified during the pre-staged transaction. Then, the cash handling device may validate the received cash at the merchant location and in real-time. Subsequently, the cash handling device may provide real-time recognition of the received cash to an account of the merchant.

In some embodiments, providing real-time recognition of the received cash to the account of the merchant may include providing the merchant with immediate access to the cash credited to the account of the merchant.

In some embodiments, providing real-time recognition of the received cash to the account of the merchant may include recognizing an immediate non-provisional credit of the amount deposited to an account of the merchant with a financial institution.

In some embodiments, the cash handling device may, in a subsequent withdrawal transaction, dispense the cash received from the merchant.

In some embodiments, presenting the graphical identifier may include presenting a quick response (QR) code. In addition, the QR code may be used for a transaction between the mobile device of the merchant and the cash handling device.

In some embodiments, verifying that the mobile device of the merchant is authorized to perform the pre-staged transaction based on the captured authentication information may include verification using mobile authentication.

In some embodiments, receiving the request to process the pre-staged transaction may include receiving the request from a smartphone, associated with the merchant, executing an application associated with a financial institution.

In some embodiments, capturing the authentication information based on the graphical identifier being scanned by the mobile device of the merchant may include identifying the merchant associated with the pre-staged transaction.

In some embodiments, the cash handling device may verify that the mobile device of the merchant is authorized to perform the pre-staged transaction based on additional authentication mechanisms including one or more of: one-time password, proximity-based authentication, or multifactor authentication.

In accordance with one or more additional embodiments, a cash handling device having at least one processor, a communication interface, a small screen display, an item accepting and dispensing device, and a memory may receive, via the item accepting and dispensing device, in a deposit transaction, a deposit that includes one or more banknotes. Subsequently, the cash handling device may scan and digitize, via the scanning unit coupled to the item accepting and dispensing device, at a point of presentment, the one or more banknotes. Next, the cash handling device may validate the one or more banknotes. Then, the cash handling device may process the one or more banknotes to obtain and store, in a datastore, identification information related to each of the one or more banknotes. Thereafter, the cash handling device may cause a cash handling device support server to generate, using the identification information related to each of the one or more banknotes, one or more reports that include information indicative of an overall cash position of an enterprise in real-time. Then, the cash handling device may cause the cash handling device support server to send one or more commands to a user computing device to display the one or more reports.

In some embodiments, causing the cash handling device support server to generate the one or more reports that include information indicative of an overall cash position of an enterprise in real-time may include generating the one or more reports based on a real-time cash position of a first cash handling device associated with the enterprise at a first location, and a real-time cash position of one or more additional cash handling devices associated with the enterprise at one or more additional locations.

In some embodiments, processing the one or more banknotes to obtain identification information related to each of the one or more banknotes may cause the cash handling device support server to identify, using an artificial intelligence algorithm, one or more cash transportation needs of the cash handling device.

In some embodiments, processing the one or more banknotes to obtain identification information related to each of the one or more banknotes may cause the cash handling device support server to generate and send one or more alerts based on identifying the one or more cash transportation needs of the cash handling device.

In some embodiments, processing the one or more banknotes to obtain identification information related to each of the one or more banknotes may cause the cash handling device support server to identify a denomination for each banknote deposited into or dispensed from the cash handling device, monitor a quantity of banknotes stored in the cash handling device for each denomination, and send one or more alerts when the quantity of banknotes stored in the cash handling device for a denomination is below a predetermined threshold.

In some embodiments, validating the one or more banknotes may cause the cash handling device to detect if any of the banknotes deposited may include counterfeit currency, and generate and send one or more alerts based on detecting the counterfeit currency.

In some embodiments, validating the one or more banknotes may include validation using one or more of ultraviolet detection, infrared detection, magnetic detection, image recognition, or text recognition.

In some embodiments, validating the one or more banknotes may include comparing the one or more banknotes with stored reference data.

In some embodiments, the generated one or more reports that include information indicative of an overall cash position of an enterprise in real-time further may include a report on trends in cash demand for an enterprise.

In some embodiments, the generated one or more reports that include information indicative of an overall cash position of an enterprise in real-time further may include an inventory report that identifies an amount of currency and denominations the currency available to be dispensed at every cash handling device associated with the enterprise.

In some embodiments, the cash handling device may cause the cash handling device support server to dynamically update the generated one or more reports based on additional data generated during execution of one or more additional cash transactions at the cash handling device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4D depict another illustrative event sequence for deploying, configuring, and utilizing cash handling devices to provide intelligent monitoring and management of cash cycles in accordance with one or more example embodiments.

FIGS. 5-12 depict illustrative graphical user interfaces associated with deploying, configuring, and utilizing cash handling devices to provide intelligent monitoring and management of cash cycles in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to deploying, configuring, and utilizing cash handling devices to provide intelligent monitoring and management of cash cycles. For illustrative purposes the financial instrument discussed throughout the below description is cash. However, as those skilled in the art will realize, the aspects described herein are not limited to just cash (e.g., paper money and coins), but may also include other forms of liquid assets such as checks, bank notes, and money orders.

Figure 1A:
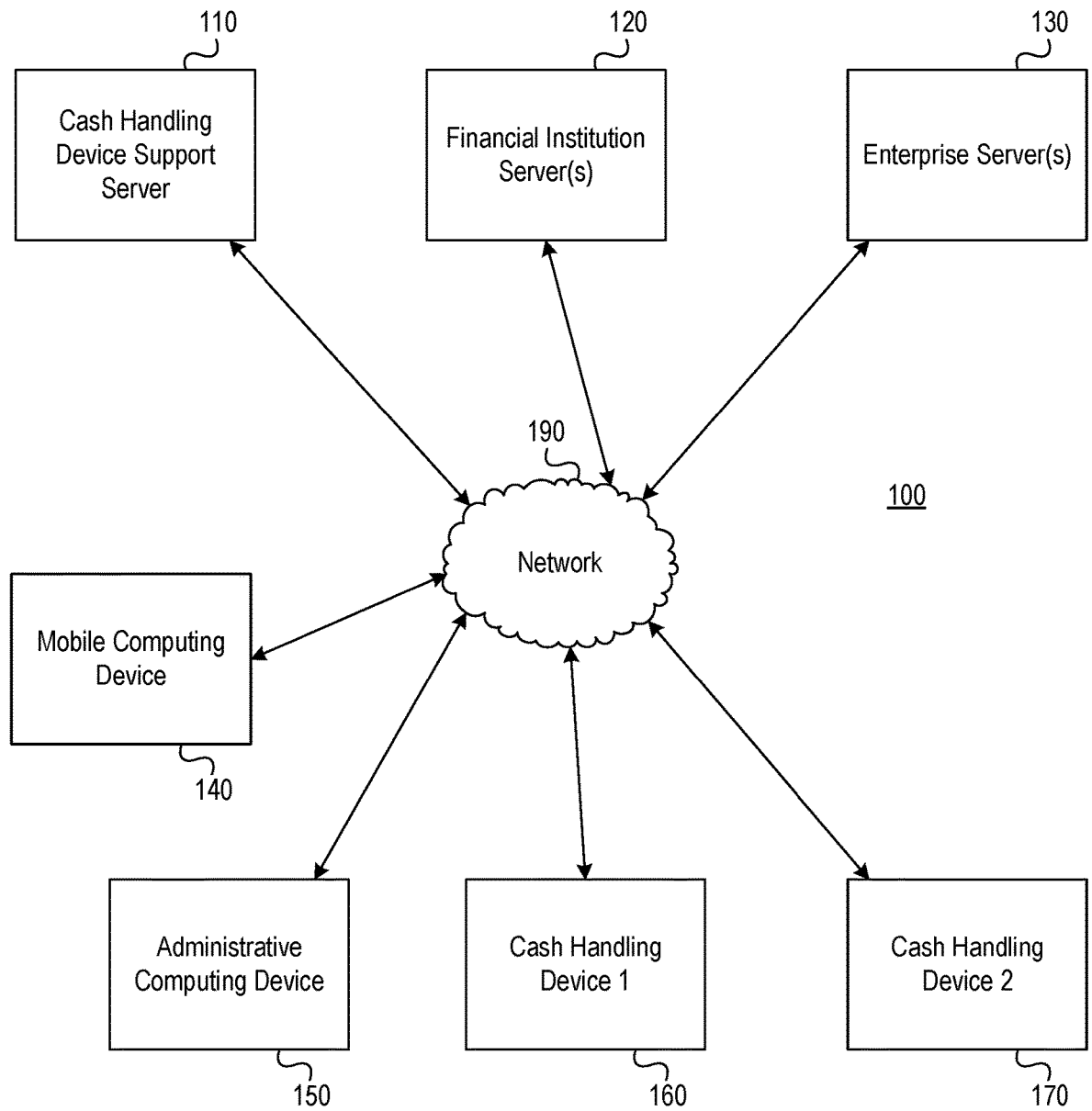
FIGS. 1A and 1B depict an illustrative computing environment for deploying, configuring, and utilizing cash handling devices to provide intelligent monitoring and management of cash cycles in accordance with one or more example embodiments.
Figure 1B:
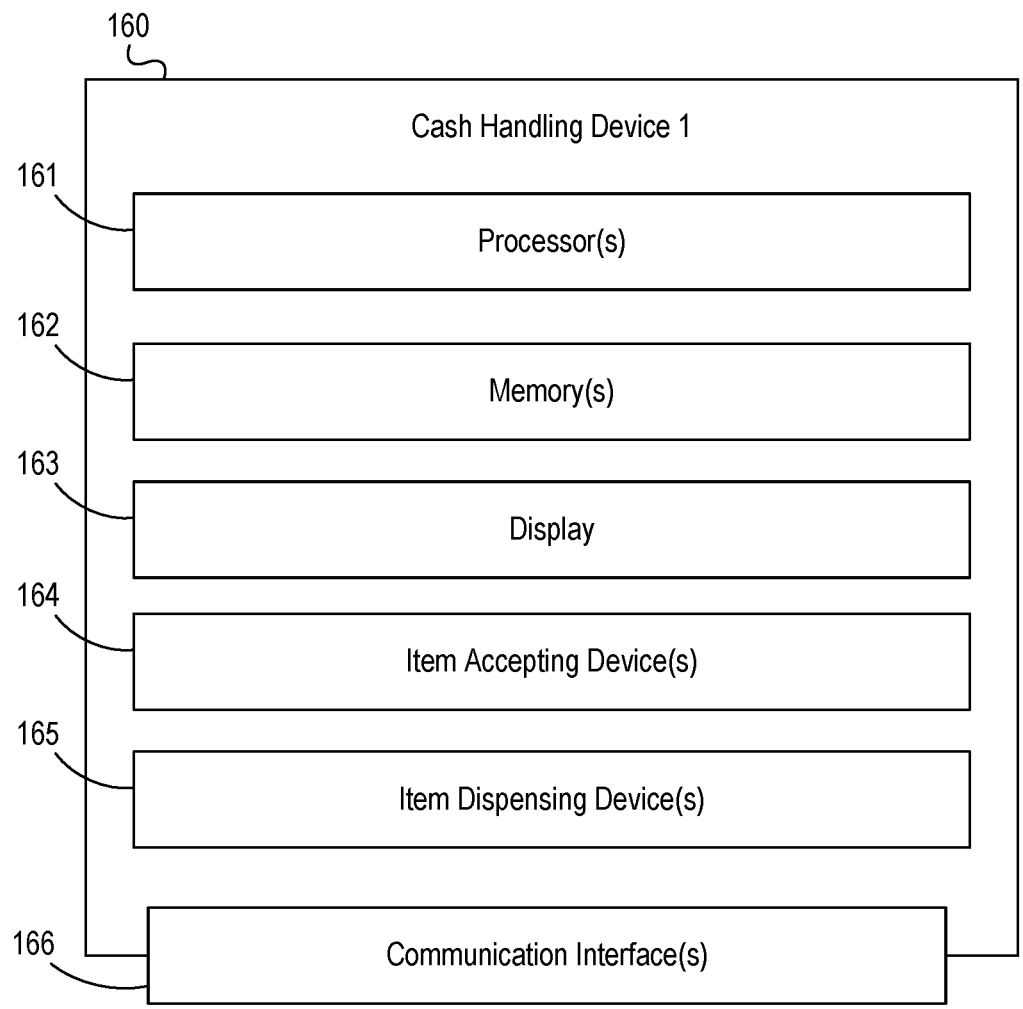

FIGS. 1A and 1B depict an illustrative computing environment for deploying, configuring, and utilizing cash handling devices to provide intelligent monitoring and management of cash cycles in accordance with one or more example embodiments. Referring to FIG. 1A, computing environment 100 may include one or more computing devices and/or other computer systems. For example, computing environment 100 may include a cash handling device support server 110, a financial institution server 120, an enterprise server 130, a mobile computing device 140, an administrative computing device 150, a first cash handling device 160, and a second cash handling device 170.

Cash handling device support server 110 may be configured to support operations of one or more cash handling devices, such as cash handling device 160 and cash handling device 170. Financial institution server 120 may be associated with a financial institution, and financial institution server 120 may be configured to provide account management, transaction history, and/or other functions associated with one or more financial accounts maintained by the financial institution. Enterprise server 130 (e.g., a point-of-sale device in a store or any other device that can receive payment from a payment instrument) may be associated with a business or enterprise, and enterprise server 130 may be configured to receive, transfer, or otherwise interact with funds associated with the business or enterprise. Administrative computing device 150 may be configured to be used by an administrative user to configure, control, and/or otherwise interact with cash handling device support server 110, cash handling device 160, cash handling device 170, and/or one or more other devices and/or systems included in computing environment 100.

Cash handling device 160 may be a cash handling device, such as a cash recycler, an automated teller machine (ATM) or an automated teller assistant (ATA), and cash handling device 160 may be configured to provide one or more automated teller functions and/or other functions, as illustrated in greater detail below. Cash handling device 170 also may be a cash handling device, such as an automated teller machine (ATM) or an automated teller assistant (ATA), and cash handling device 170 may be configured to provide one or more automated teller functions and/or other functions, similar to cash handling device 160. Cash handling device 160 and cash handling device 170 may be located at various (e.g., multiple) sites and locations, such as at a financial center (e.g., in the lobby of a bank or behind a teller line) or at a merchant location (e.g., as an automated cash drawer). In one aspect, the cash handling devices (e.g., cash handling device 160, and cash handling device 170) may be freestanding and portable.

Mobile computing device 140 may be and/or include a handheld mobile device (e.g., a smartphone or tablet) that may be linked to and/or used by a client user (who may, e.g., be a customer of an enterprise organization, such as a financial institution) or by servicing personnel (who may, e.g., service a cash handling device). In some examples, mobile computing device 140 may be and/or include an augmented reality device (e.g., a head set-style augmented reality device, or a handheld or mobile display device) or the like. In some instances, mobile computing device 140 may allow users to pre-stage a transaction as the user approaches the cash handling device (e.g., cash handling device 160, and cash handling device 170). In receiving the pre-transaction input, the mobile computing device 140 may cause efficiency gains with respect to cash transactions that otherwise would not be able to be initiated until a customer is physically located at the cash handling device (e.g., cash handling device 160, and cash handling device 170).

In one or more arrangements, cash handling device support server 110, financial institution server 120, enterprise server 130, mobile computing device 140, and administrative computing device 150 may be any type of computing device capable of receiving a user interface, receiving input via the user interface, and communicating the received input to one or more other computing devices. For example, cash handling device support server 110, financial institution server 120, enterprise server 130, mobile computing device 140, and administrative computing device 150 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of cash handling device support server 110, financial institution server 120, enterprise server 130, mobile computing device 140, and administrative computing device 150 may, in some instances, be special-purpose computing devices configured to perform specific functions.

Computing environment 100 also may include one or more networks, which may interconnect one or more of cash handling device support server 110, financial institution server 120, enterprise server 130, mobile computing device 140, administrative computing device 150, cash handling device 160, and cash handling device 170. For example, computing environment 100 may include network 190, which may include one or more public networks, private networks, and/or sub-networks (e.g., local area networks (LANs), wide area networks (WANs), or the like).

Referring to FIG. 1B, cash handling device 160 may include one or more processors 161, memory(s) 162, and communication interface(s) 166. Cash handling device 160 also may include a display 163, one or more item accepting device(s) 164, and one or more item dispensing device(s) 165. A data bus may interconnect processor(s) 161, memory(s) 162, display 163, item accepting device(s) 164, item dispensing device(s) 165, and communication interface(s) 166. In some embodiments, an item accepting device 164 and an item dispensing device 165 may be a single device (e.g., a single opening for accepting and dispensing cash).

Display 163 may be and/or include a device having a small-screen display (e.g., a small or miniature screen displaying basic and simple directions). Item accepting device(s) 164 may be and/or include one or more electro-mechanical systems configured to receive currency, checks, cards, and/or other items (e.g., from a user of cash handling device 160) and physically organize and/or store the received items in one or more canisters, cartridges, and/or other storage components of cash handling device 160. Item dispensing device(s) 165 may be and/or include one or more electro-mechanical systems configured to physically retrieve one or more items from one or more canisters, cartridges, and/or other storage components of cash handling device 160 and dispense and/or otherwise output the retrieved items (e.g., to a user of cash handling device 160). Additionally or alternatively, item dispensing device(s) 165 may include one or more printers and/or other components configured to print and/or otherwise generate one or more receipts and/or other items (which may, e.g., be output to a user of cash handling device 160).

Communication interface 166 may be and/or include one or more network interfaces configured to support communication between cash handling device 160 and one or more networks (e.g., network 190). Memory 162 may be and/or include one or more memory units that include one or more program modules having instructions that when executed by processor(s) 161 cause cash handling device 160 to perform one or more functions described herein and/or one or more databases that may store and/or otherwise maintain information which may be used by such program modules and/or processor(s) 161. In some instances, the one or more program modules and/or databases may be stored by and/or maintained in different memory units of cash handling device 160 and/or by different computing devices that may form and/or otherwise make up cash handling device 160.

In one or more arrangements, memory 162 may be or include a flash drive (e.g., a compact flash drive). The memory 162 may facilitate a compact build that minimizes use of physical components and maximizes portability of the cash handling device (e.g., cash handling device 160), for example, by reducing the size of its footprint. In one or more arrangements, physical components of cash handling device 160 may be reduced to the minimum required hardware elements.

In one or more arrangements, display 163 may be a small or miniature screen integrated with the cash handling device 160 that is compact and non-intrusive. In some examples, cash handling device 160 may generate and display, on display 163, a graphical identifier (e.g., a Quick Response (QR) code, barcode, or other scannable code or identifier). Such a graphical identifier may be used to identify a mobile computing device 140 (e.g., a smart phone or a tablet) for communicating with the cash handling device 160 (e.g., to drive or trigger a transaction). A user of a mobile computing device 140 may be prompted to scan the graphical identifier using the mobile computing device 140 to establish a communication connection with the cash handling device (e.g., cash handling device 160) and/or support server (e.g., cash handling device support server 110). Thereafter, transactions may be communicated to the cash handling device (e.g., cash handling device 160) via the user's mobile computing device (e.g., mobile computing device 140). In some examples, the user of the mobile computing device 140 may capture the graphical identifier using a mobile phone camera, a QR code scanner, a bar code scanner, radio frequency identification (RFID) technology, or the like. In some examples, the graphical identifier may be a dynamic or trackable QR code that changes on a periodic basis. The dynamic QR code may track data including a time, location, date and device type used to scan the code, and may be used to identify users who scanned the code.

In some embodiments, display 163 may generate and present a set of user interface procedures tailored for visually impaired users. In some embodiments, display 163 may be the only display screen on the cash handling device 160. In some examples, cash handling device 160 may provide, on display 163, only basic and simple directions to a user (e.g., "Insert Cash", "Take Cash", "Transaction Complete"). In some examples, cash handling device 160 may utilize $5^{th}$ generation (5G) communication technology or a different technology (e.g., Wi-Fi technology) for fast data transmission with the mobile computing device (e.g., mobile computing device 140).

For instance, in one example scenario, a user may enter a financial center with a cash need. Subsequently, the user may pre-stage a transaction on a user mobile computing device (e.g., mobile computing device 140, via a mobile application). Next, the user of the mobile computing device 140 may be prompted to scan a QR code presented on a screen 163 on cash handling device 160. Then, cash handling device 160 may authenticate the mobile computing device 140 and/or the user of the mobile computing device 140, and establish a communication session with the mobile computing device 140. In turn, cash handling device 160 may receive or dispense cash or other financial instruments in accordance with the pre-staged transaction. For example, the user may deposit or withdraw cash without physical interaction with the cash handling device (e.g., a contactless interaction). In some examples, cash handling device 160 may be configured to dispense the same currency that was earlier deposited. Thus, the deposited cash may be placed immediately back into use and circulation which may, for example, reduce one-time expenses and the time required for servicing the cash handling device. Upon completion of a transaction, cash handling device 160 may provide a confirmation message to the mobile computing device (e.g., mobile computing device 140). Thus, a retail or financial institution may provide immediate access and use of funds recently deposited using the cash handling device, system, and method described herein.

In one or more arrangements, the cash handling device (e.g., cash handling device 160, and cash handling device 170) may use artificial intelligence software and/or functionality (e.g., artificial intelligence (AI) code) to manage and monitor cash positions across an enterprise or financial institution and automatically schedule servicing (e.g., cash transportation services) when a need is detected. Various artificial intelligence algorithms may be used and adapted for this application, such as neural network algorithms, statistical classification algorithms, machine learning algorithms, Bayesian network algorithms, swarm intelligence algorithms, logic algorithms, and/or combinations of the foregoing algorithms. For example, the cash handling device (e.g., cash handling device 160, and cash handling device 170) may enable automatic buying and selling of currency. In some embodiments, the cash handling device (e.g., cash handling device 160, and cash handling device 170) may use artificial intelligence techniques to detect potential wrongdoing (e.g., money laundering, money counterfeiting, and/or other fraudulent or problematic activity). For example, a counterfeit detection feature of the cash handling device may include ultraviolet (UV), infrared (IR), magnetic (MG), image recognition, serial number recognition, text recognition, or other detection functions. Additionally or alternatively, the cash handling device (e.g., cash handling device 160, and cash handling device 170) may send alerts or notifications regarding fraudulent or problematic activity and trigger investigations.

In one or more arrangements, the cash handling devices (e.g., cash handling device 160, and cash handling device 170) may be implemented at multiple or all retail or financial centers such that all cash transactions may be digitized at a point of presentment rather than being an unorganized collection of separate cash operations at separate locations (e.g., at an ATM and at a financial center). By digitizing each and every cash note, the cash handling system (e.g., computing environment 100) may provide easily accessible, real-time cash flow information for all banks, point-of-sale terminals, and/or automated teller machines. For example, the cash handling system may allow for centralized automated monitoring of each and every financial centers' cash note position at any point in time. In some examples, a financial center may be able to, immediately, at a point of presentment, receive a digital record or report on cash holdings and automatically manage and monitor cash levels. In some embodiments, the cash handling device (e.g., cash handling device 160, and cash handling device 170) may store information about its contents including denominations of cash, and send alerts on which denominations have been deposited or need to be replenished. In some instances, a detection unit of the cash handling device (e.g., cash handling device 160, and cash handling device 170) may recognize, capture, and sort, denominations of bills and may handle all types of notes (e.g., worn and new) in any currency.

In some instances, uniform implementation of cash handling devices (e.g., cash handling device 160, and cash handling device 170) at retail or financial centers may enable automation of a cash supply chain such that just-in-time cash solutions may be implemented (e.g., cash ordering may be based on supply and demand rather than handled on a periodic basis). Additionally, equipment such as cash vaults, counters, teller drawers, and safes may be downsized. In some embodiments, the cash handling device (e.g., cash handling device 160, and cash handling device 170) may validate and digitize each note and a server (e.g., cash handling device support server 110) may generate reports on a site's overall cash position. In some examples, a server (e.g., cash handling device support server 110) may generate reports on daily and seasonal variations, or trends, in cash demand.

In some instances, the cash handling device (e.g., cash handling device 160, and cash handling device 170) may be integrated with a front-end point-of-sale (POS) system (e.g., enterprise server 130). In one example, in addition to (e.g., before or after) interacting with the POS terminal (e.g., a cash register), a merchant may perform various transactions with the integrated cash handling device located at the merchant location. For example, the merchant may use the integrated cash handling device to withdraw cash, fill the POS terminal, or pay for goods or services received. Thus, the cash handling device may serve as an automated cash drawer for the merchant.

In some instances, the cash handling devices (e.g., cash handling device 160, and cash handling device 170) may also provide marketing, product offers and/or purchases, payments, location-specific analytics, and/or the like, to provide additional services and values. For instance, the cash handling system (e.g., computing environment 100) may drive continuous usage by linking users (e.g., clients, consumers) to retailers through targeted marketing, such as locations for withdrawing cash or locations for using a coupon (e.g., driving traffic to a merchant location).

In some instances, the cash handling device (e.g., cash handling device 160, cash handling device 170) may utilize blockchain technology and/or other secure communications technology to facilitate operations. For example, an operator or servicing personnel may be responsible for restocking the cash handling device (e.g., cash handling device 160, cash handling device 170), rather than a particular financial institution. Blockchain technology may be used by the cash handling device (e.g., cash handling device 160, cash handling device 170) to accelerate transaction speed and/or facilitate other types of transactions in addition to cash transactions such as cash withdrawals and deposits. Additionally or alternatively, the cash handling device (e.g., cash handling device 160, cash handling device 170) may use blockchain technology to track transactions, which may in turn enable the cash handling device (e.g., cash handling device 160, cash handling device 170) to handle a relatively larger amount of transaction volume while reducing its physical cash transportation needs.

In some instances, servicing personnel may unlock the cash handling device (e.g., cash handling device 160, and cash handling device 170) using a handheld or mobile device rather than a dual key and combination lock. In some examples, the cash handling device (e.g., cash handling device 160, and cash handling device 170) may be notified of the servicing personnel's arrival in advance and other additional details regarding the servicing transaction in advance, such that upon arrival, the servicing personnel need only scan their mobile device at an interface on the cash handling device (e.g., cash handling device 160, and cash handling device 170) in order to trigger the servicing transaction. The time required for servicing the cash handling device (e.g., cash handling device 160, and cash handling device 170) may be reduced and less prone to error.

In one or more arrangements, the cash handling device (e.g., cash handling device 160, and cash handling device 170) may be a "headless" device without a screen, keypad, or card reader.

Figure 2A:
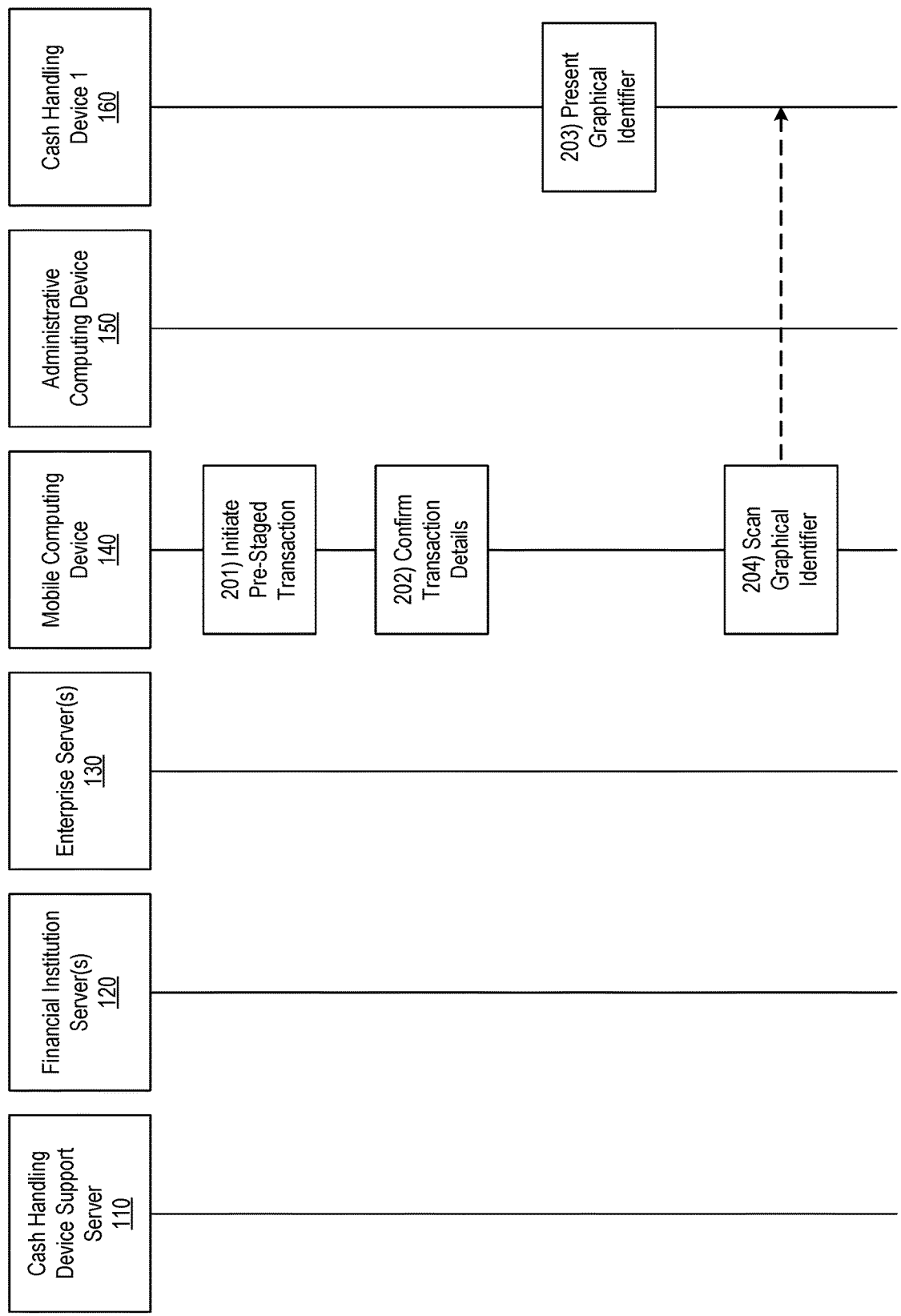
FIGS. 2A-2C depict an illustrative event sequence for deploying, configuring, and utilizing cash handling devices to provide intelligent monitoring and management of cash cycles in accordance with one or more example embodiments.
Figure 2B:
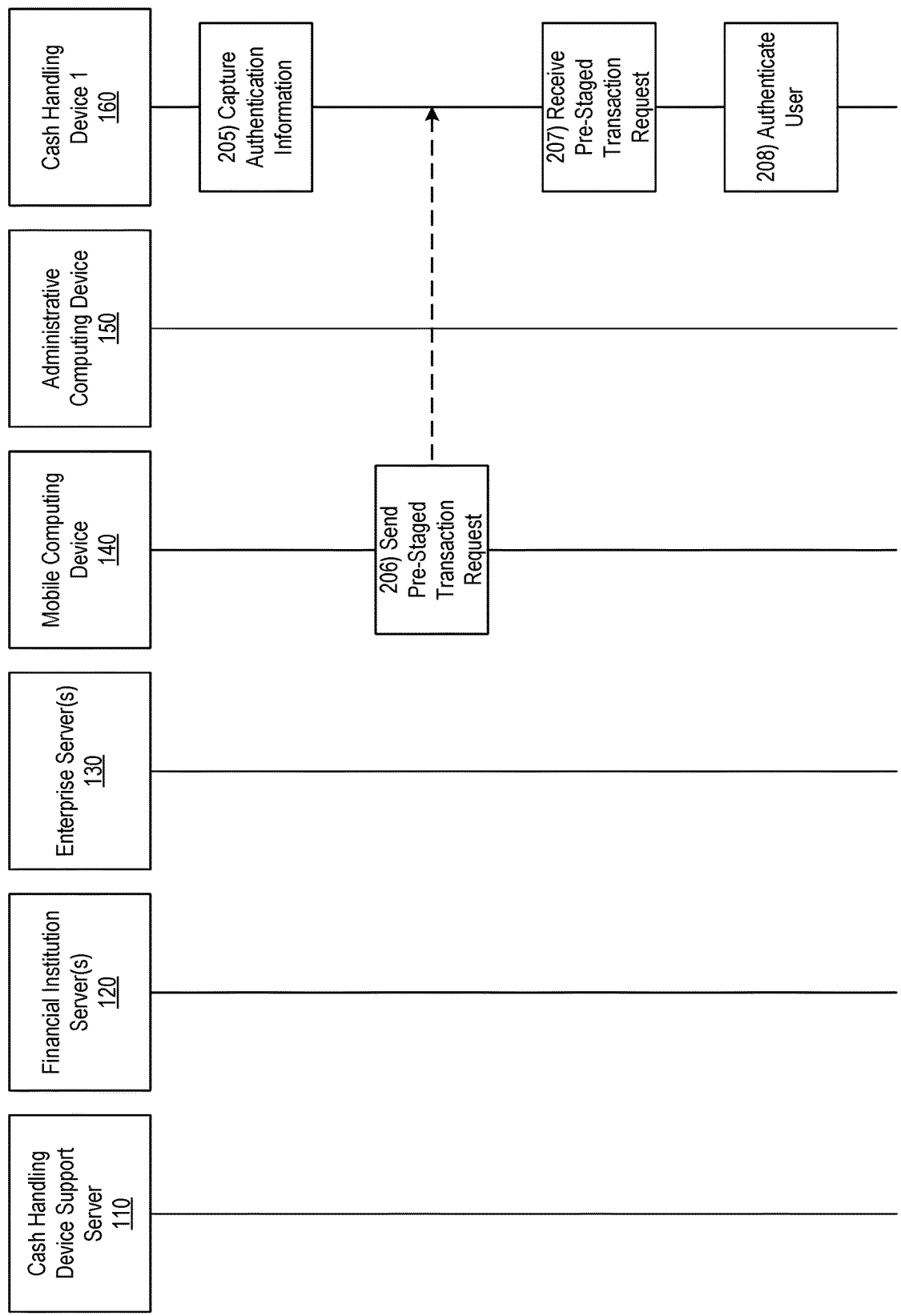
Figure 2C:
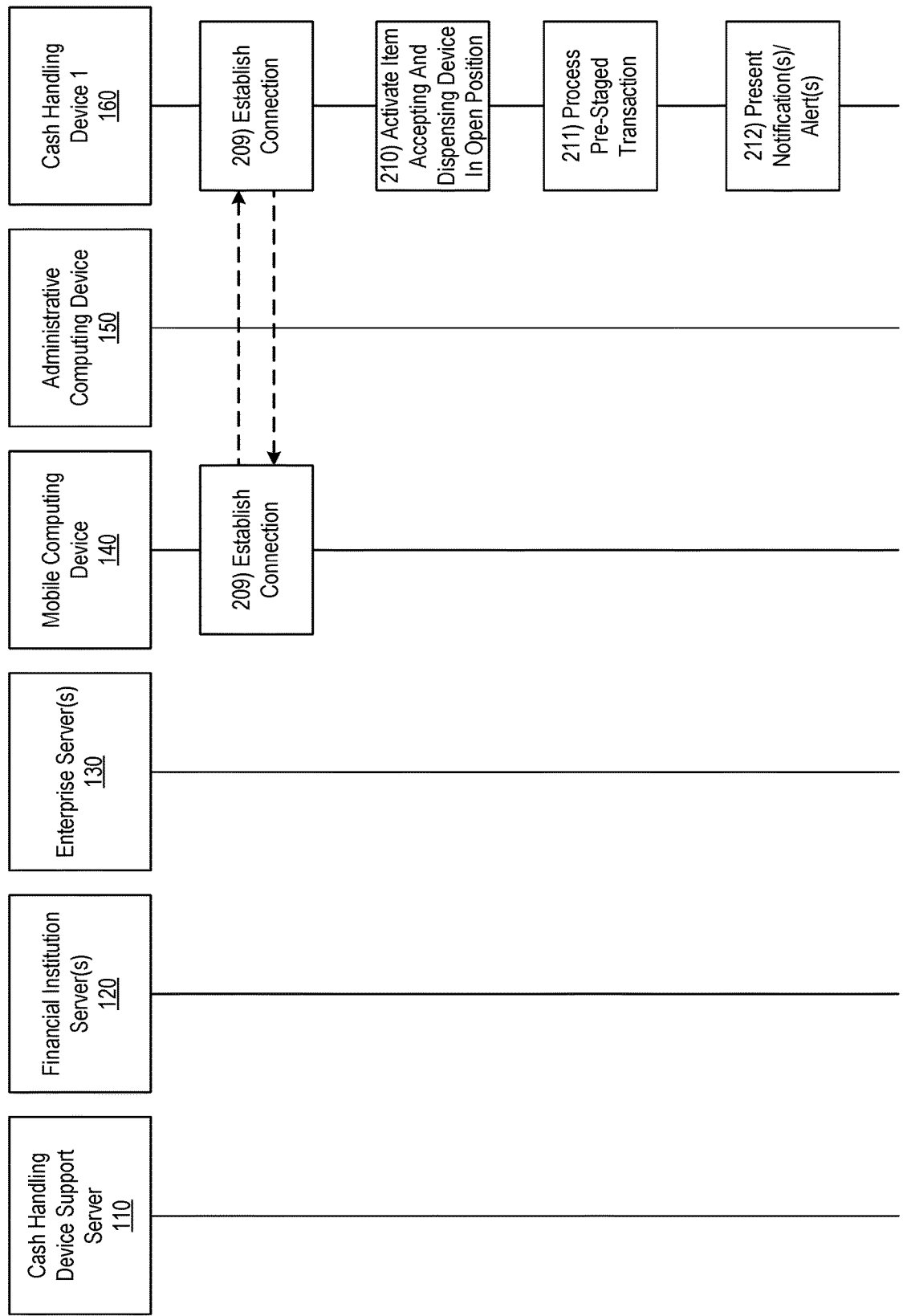

FIGS. 2A-2C depict an illustrative event sequence for deploying, configuring, and utilizing cash handling devices to provide intelligent monitoring and management of cash cycles in accordance with one or more example embodiments. For example, the example event sequence depicted in FIGS. 2A-2C illustrates how a cash handling device, such as cash handling device 160, may be used to enable touchless deposit and/or withdrawal transactions from various users. Additionally, techniques may be implemented to perform authentication be over a mobile network rather than conventional routing through ATM and/or backend networks.

Referring to FIG. 2A, at step 201, a customer or other individual may initiate a pre-staged transaction on a mobile device (e.g., mobile computing device 140). In some embodiments, mobile computing device 140 may be a customer-driven tool. For example, mobile computing device 140 may be any type of personal portable computing device (e.g., a mobile phone, a smartphone, a personal digital assistant (PDA), a personal media device, a tablet computer, and/or the like) capable of providing an individual (e.g., a customer of a financial institution) with an interface for performing a cash transaction with a cash handling device (e.g., cash handling device 160). For example, mobile computing device 140 may be a smartphone executing an application (e.g., a mobile application) associated with a financial institution for performing one or more cash transactions with the cash handling device (e.g., cash handling device 160). Additionally or alternatively, mobile computing device 140 may be an associate-driven tool. For example, mobile computing device 140 may be a tablet computer, a laptop computer, and/or the like executing an application for assisting an individual (e.g., a customer of a financial institution) in performing a cash transaction with a cash handling device (e.g., cash handling device 160). For example, mobile computing device 140 may be one or more computing devices utilized by an associate of a financial institution to perform and/or assist an individual in performing a cash transaction (e.g., a deposit, a withdrawal, and/or the like) with the cash handling device (e.g., cash handling device 160). At step 202, the user of the mobile device may confirm the pre-staged transaction details (e.g., which account to transact with, a dollar amount, and/or the like).

Figure 5:
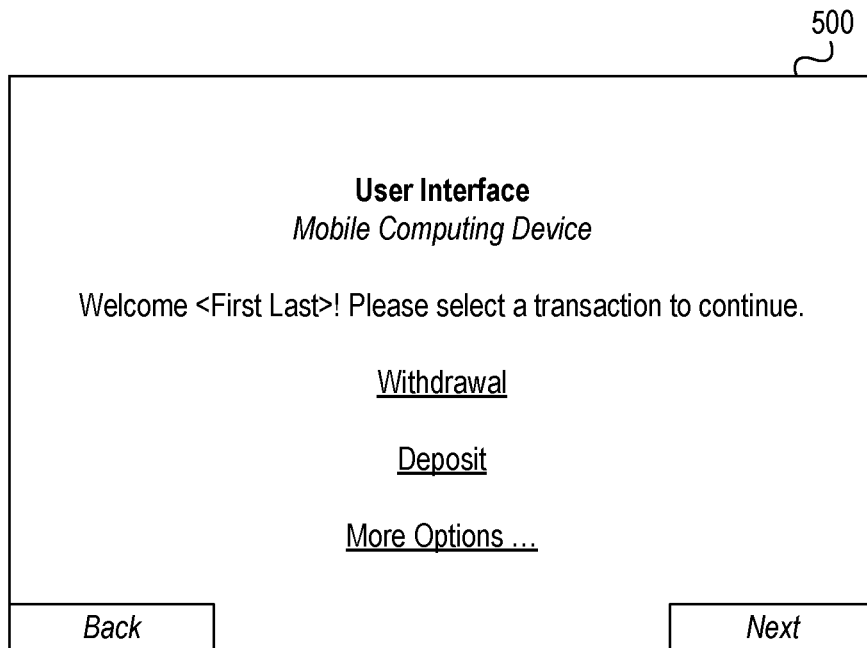
Figure 6:
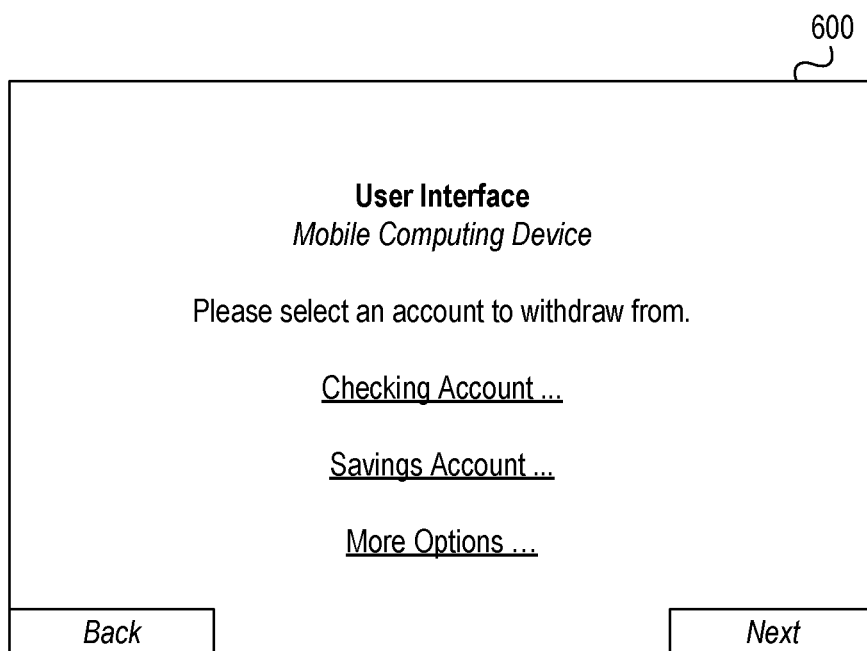

In some instances, mobile computing device 140 may display and/or otherwise present one or more graphical user interfaces (e.g., on a display screen of the mobile computing device 140). For example, mobile computing device 140 may display and/or otherwise present one or more graphical user interfaces similar to graphical user interfaces 500, 600, and 700, which are illustrated in FIGS. 5, 6, and 7. As seen in FIG. 5, graphical user interface 500 may include text and/or other information for initiating a pre-staged transaction at mobile computing device 140, prompting the user of the mobile computing device 140 to select a type of transaction being requested by the user of the mobile computing device 140 (e.g., "Withdrawal," "Deposit"). As seen in FIG. 6, graphical user interface 600 may include text and/or other information for initiating a pre-staged transaction at mobile computing device 140, prompting the user of the mobile computing device 140 to select a user account associated with the transaction being requested by the user of the mobile computing device 140 (e.g., "Checking Account," "Savings Account"). As seen in FIG. 7, graphical user interface 700 may include text and/or other information for initiating a pre-staged transaction at mobile computing device 140, prompting the user of the mobile computing device 140 to confirm a cash amount associated with the transaction being requested by the user of the mobile computing device 140 (e.g., "Amount 1," "Amount 2," "Amount 3," "Enter Different Amount"). It will be appreciated that other and/or different notifications may also be provided.

In some embodiments, cash handling device 160 may require users to identify and/or authenticate themselves to the cash handling device 160 before the cash handling device will initiate, perform, complete, and/or facilitate the transaction (e.g., the pre-staged transaction). For example, in some embodiments, the cash handling device 160 may be configured to authenticate a user based at least partially on a quick response (QR) code and/or one or more other credentials. At step 203, cash handling device 160 may present a graphical identifier on a small screen display. For example, cash handling device 160 may present a quick response (QR) code used for a secure transaction between the mobile device (e.g., mobile computing device 140) and the cash handling device (e.g., cash handling device 160). Such a graphical identifier may be used to identify the mobile computing device 140 (e.g., a smart phone or a tablet) for communicating with the cash handling device 160 to drive or trigger the transaction.

At step 204, cash handling device 160 may cause the mobile computing device 140 to scan the graphical identifier. For example, cash handling device 160 may cause the mobile computing device (e.g., the mobile computing device 140) to display and/or otherwise present one or more user interfaces similar to graphical user interface 800, which is illustrated in FIG. 8. As seen in FIG. 8, user interface 800 may include text and/or other information prompting the user of the mobile computing device to use the mobile computing device (e.g., the mobile computing device 140) to capture the graphical identifier associated with the cash handling device (e.g., cash handling device 160). It will be appreciated that other and/or different notifications may also be provided.

Referring to FIG. 2B, at step 205, based on the graphical identifier being scanned by the mobile computing device 140, cash handling device 160 may capture authentication information. In some examples, in capturing the authentication information, cash handling device 160 may identify the user associated with the pre-staged transaction (e.g., the user with authority to decision the transaction) and/or the device associated with the pre-staged transaction.

At step 206, mobile computing device 140 (e.g., a customer's smartphone or an associate's tablet computer) may send a request to process the pre-staged transaction, and in turn at step 207, cash handling device 160 may receive, via the communication interface, the request to process the pre-staged transaction.

At step 208, cash handling device 160 may authenticate the user of the mobile computing device 140. For example, cash handling device 160 may verify that the mobile device (e.g., mobile computing device 140) is authorized to perform the pre-staged transaction based on the captured authentication information (e.g., at step 205). For instance, cash handling device 160 may use mobile authentication for verification that the mobile device (e.g., mobile computing device 140) is authorized to perform the pre-staged transaction. In some embodiments, cash handling device 160 may verify that the mobile device (e.g., mobile computing device 140) is authorized to perform the pre-staged transaction based on additional authentication mechanisms including one or more of: one-time password, proximity-based authentication, or multifactor authentication. Other types of authentication requests may also be used in addition to or instead of those described.

Figure 9:
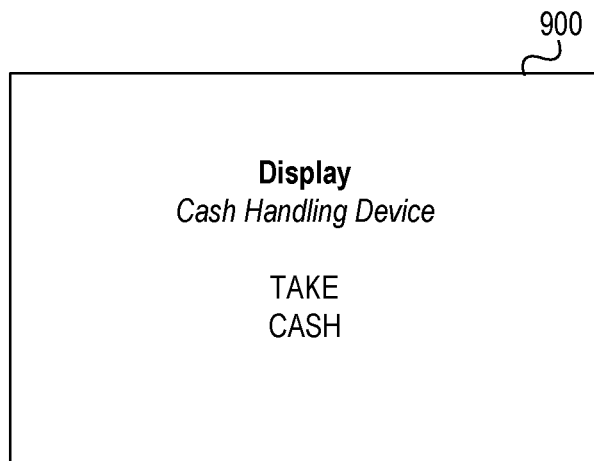

Referring to FIG. 2C, at step 209, after verifying that the mobile device (e.g., mobile computing device 140) is authorized to perform the pre-staged transaction based on the captured authentication information, cash handling device 160 may cause a connection (e.g., a mobile network connection) to be established between the cash handling device 160 and the mobile device (e.g., mobile computing device 140). In turn, at step 210, cash handling device 160 may activate the item accepting and dispensing device in an open position to accept or dispense cash in accordance with the pre-staged transaction. In some examples, after activating the item accepting and dispensing device in an open position to accept or dispense cash in accordance with the pre-staged transaction, cash handling device 160 may present a notification associated with processing of the pre-staged transaction. For example, cash handling device 160 may display and/or otherwise present a graphical user interface similar to graphical user interface 900, which is illustrated in FIG. 9. As seen in FIG. 9, graphical user interface 900 may include basic and simple directions to a user (e.g., "Take Cash"). It will be appreciated that other and/or different notifications may also be provided.

Figure 10:
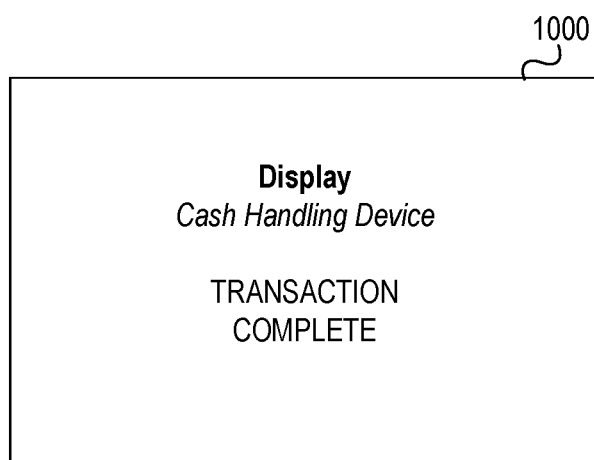
Figure 11:
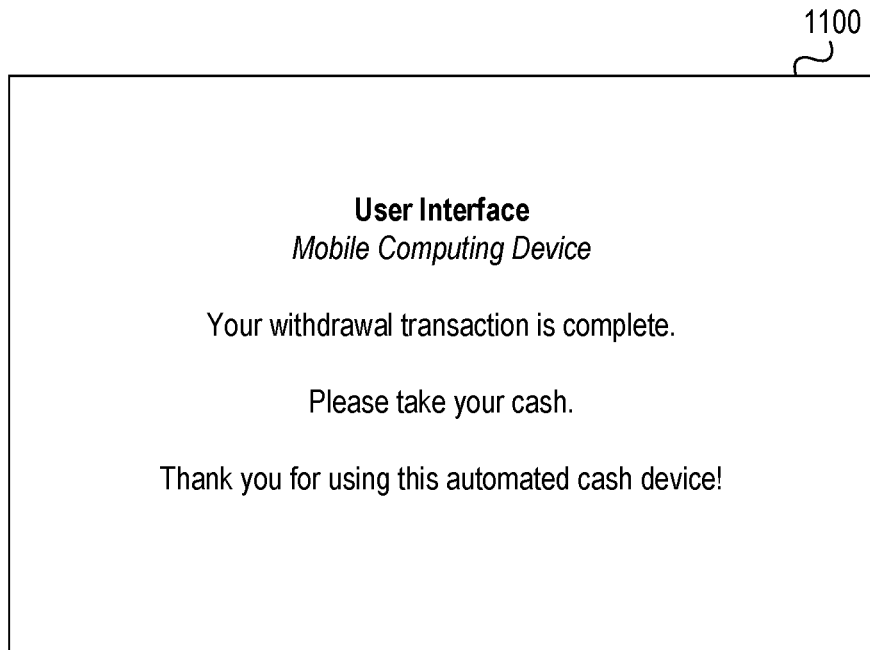

At step 211, cash handling device 160 may receive or dispense cash, via the item accepting and dispensing device, in accordance with the pre-staged transaction. For example, a user of the mobile computing device 140 may simply insert or remove cash without touching cash handling device 150, and the cash handling device 150 handles the rest of the steps for processing the cash transaction. At step 212, cash handling device 160 may present a notification indicating completed processing of the pre-staged transaction. For example, cash handling device 160 may display and/or otherwise present a graphical user interface similar to graphical user interface 1000, which is illustrated in FIG. 10. As seen in FIG. 10, graphical user interface 1000 may include basic and simple directions to a user (e.g., "Transaction Complete"). Additionally or alternatively, cash handling device 150 may cause a user's mobile computing device (e.g., mobile computing device 140) to display and/or otherwise present a graphical user interface similar to graphical user interface 1100, which is illustrated in FIG. 11. As seen in FIG. 11, graphical user interface 1100 may include text and/or other information indicating completed processing of the pre-staged transaction. It will be appreciated that other and/or different notifications may also be provided. In addition, in some instances, one or more steps of the example event sequences may be repeated, skipped, and/or combined.

FIGS. 3A-3E depict another illustrative event sequence for deploying, configuring, and utilizing cash handling devices to provide intelligent monitoring and management of cash cycles in accordance with one or more example embodiments. For example, the example event sequence depicted in FIGS. 3A-3E illustrates how a cash handling device, such as cash handling device 160, may be used to enable touchless deposit and/or withdrawal transactions in a merchant use case. For instance, cash handling device 160 located at a merchant location may serve as an automated cash drawer for the merchant.

Figure 3A:
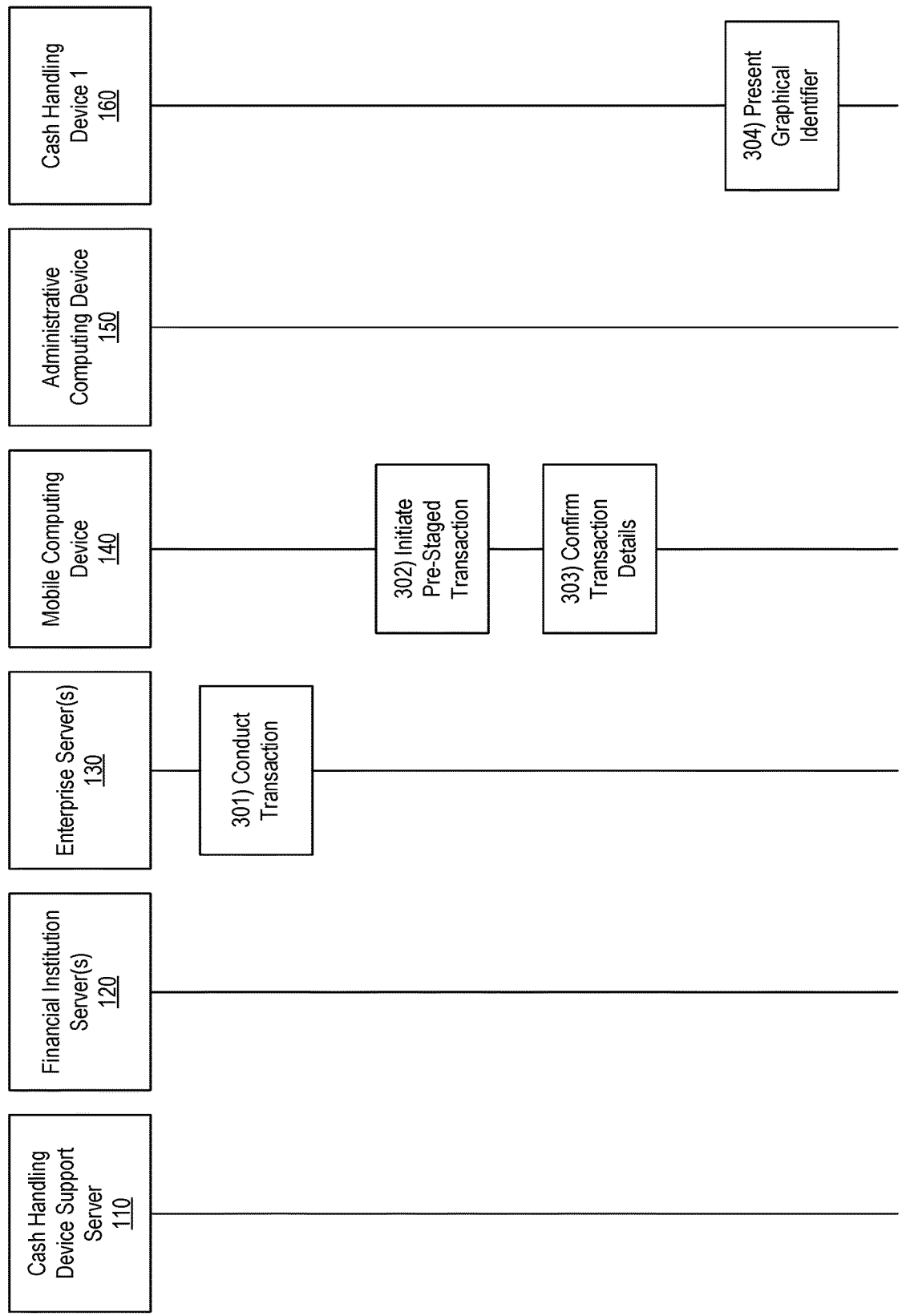
FIGS. 3A-3E depict another illustrative event sequence for deploying, configuring, and utilizing cash handling devices to provide intelligent monitoring and management of cash cycles in accordance with one or more example embodiments.

Referring to FIG. 3A, at step 301, a merchant may conduct a transaction (e.g., a cash transaction) at a front-end point-of-sale (POS) system (e.g., enterprise server 130) integrated with a cash handling device (e.g., cash handling device 160). For example, the merchant may receive cash designated as payment to the merchant from the transaction at the point-of-sale terminal.

Subsequently, at step 302, a merchant may initiate a pre-staged transaction on a mobile computing device (e.g., mobile computing device 140). For example, mobile computing device 140 may be any type of personal portable computing device (e.g., a mobile phone, a smartphone, a personal digital assistant (PDA), a personal media device, a tablet computer, and/or the like) capable of providing a merchant with an interface for performing a cash transaction with a cash handling device (e.g., cash handling device 160). At step 303, the merchant, via the mobile device, may confirm the pre-staged transaction details (e.g., which account to deposit/withdraw from, an amount of cash for deposit/withdrawal, and/or the like). For example, mobile computing device 140 may display and/or otherwise present one or more graphical user interfaces similar to graphical user interfaces 500, 600, and 700, which are illustrated in FIGS. 5, 6, and 7, as described above.

At step 304, cash handling device 160 may present a graphical identifier on a small screen display. For example, cash handling device 160 may present a quick response (QR) code used for a secure transaction between the merchant's mobile device (e.g., mobile computing device 140) and the cash handling device (e.g., cash handling device 160).

Figure 3B:
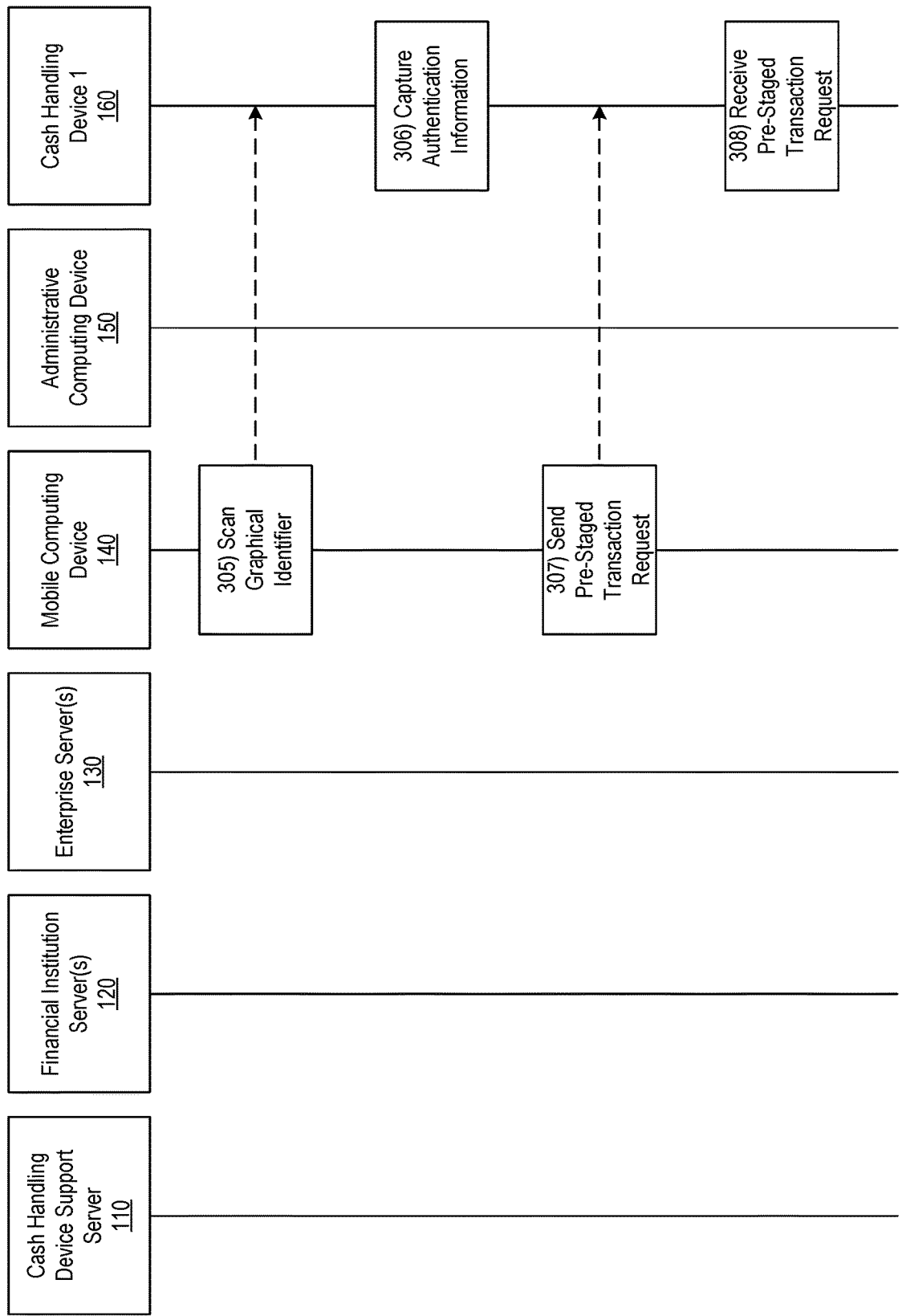

Referring to FIG. 3B, at step 305, cash handling device 160 may cause the merchant's mobile device (e.g., mobile computing device 140) to scan the graphical identifier. For example, cash handling device 160 may cause the mobile computing device (e.g., the mobile computing device 140) to display and/or otherwise present one or more user interfaces similar to graphical user interface 800, which is illustrated in FIG. 8, as described above. In turn, at step 306, based on the graphical identifier being scanned by the merchant's mobile device (e.g., mobile computing device 140), cash handling device 160 may capture authentication information. For example, in capturing the authentication information, cash handling device 160 may identify the merchant associated with the pre-staged transaction (e.g., the user with authority to decision the transaction).

At step 307, the merchant's mobile device (e.g., mobile computing device 140) may send a request to process the pre-staged transaction to deposit cash designated as payment to the merchant from a transaction at the point-of-sale terminal, and in turn at step 308, cash handling device 160 may receive, via the communication interface, the request to process the pre-staged transaction.

Figure 3C:
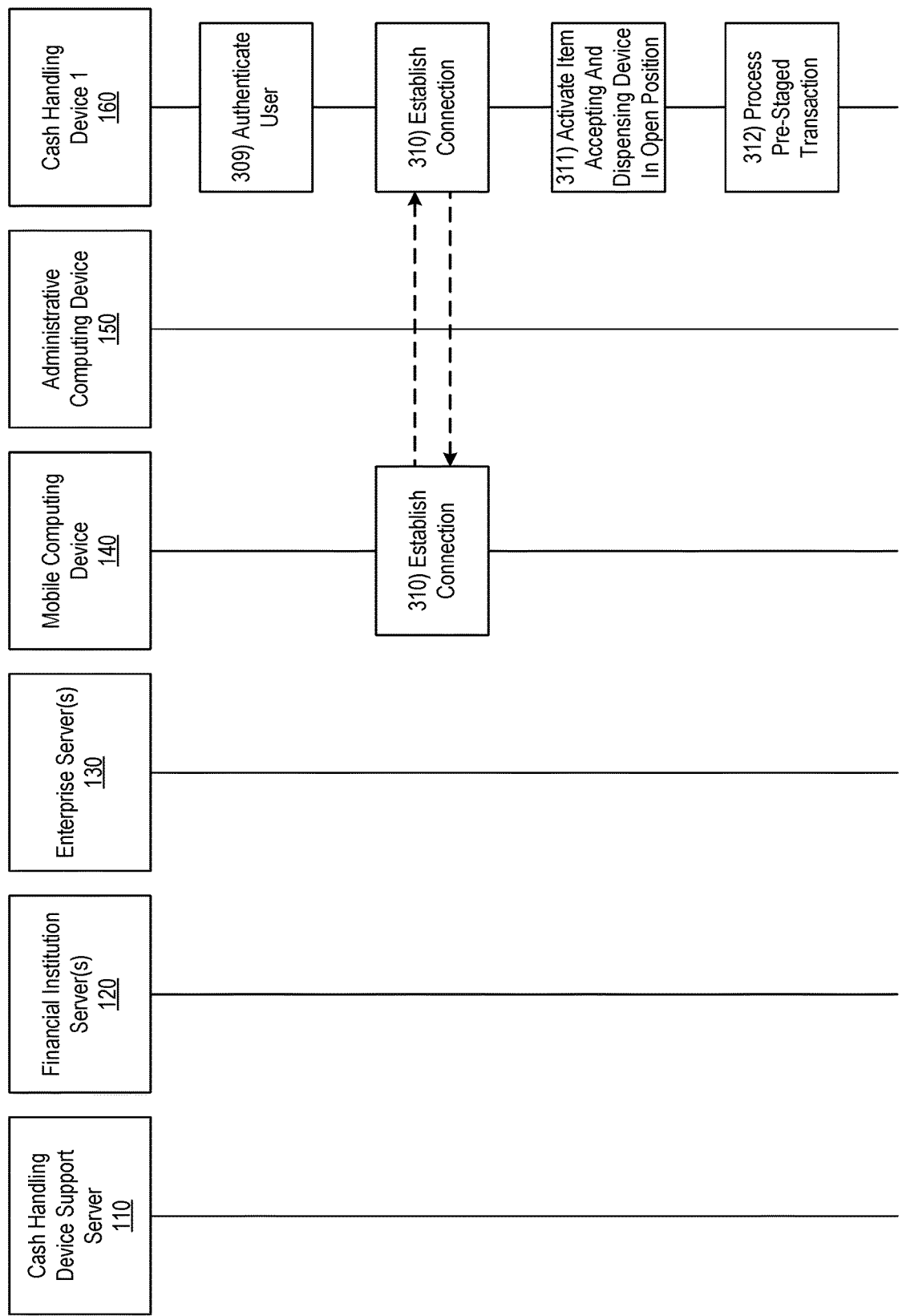

Referring to FIG. 3C, at step 309, cash handling device 160 may authenticate the user of the mobile computing device 140. For example, cash handling device 160 may verify that the merchant's mobile device (e.g., mobile computing device 140) is authorized to perform the pre-staged transaction based on the captured authentication information (e.g., at step 306). For example, cash handling device 160 may use mobile authentication for verification that the mobile device (e.g., mobile computing device 140) is authorized to perform the pre-staged transaction. In some embodiments, cash handling device 160 may verify that the merchant mobile device (e.g., mobile computing device 140) is authorized to perform the pre-staged transaction based on additional authentication mechanisms including one or more of: one-time password, proximity-based authentication, or multifactor authentication. Other types of authentication requests may also be used in addition to or instead of those described.

At step 310, after verifying that the merchant's mobile device (e.g., mobile computing device 140) is authorized to perform the pre-staged transaction based on the captured authentication information, cash handling device 160 may cause a connection (e.g., a mobile network connection) to be established between the cash handling device 160 and the merchant's mobile device (e.g., mobile computing device 140). In turn, at step 311, cash handling device 160 may activate the item accepting and dispensing device in an open position to accept cash for deposit into the cash handling device 160 in accordance with the pre-staged transaction. In some examples, after activating the item accepting and dispensing device in an open position to accept cash for deposit into the cash handling device 160, cash handling device 160 may present a notification associated with processing of the pre-staged transaction. For example, cash handling device 160 may display and/or otherwise present a graphical user interface similar to graphical user interface 900, which is illustrated in FIG. 9, as described above.

Figure 3D:
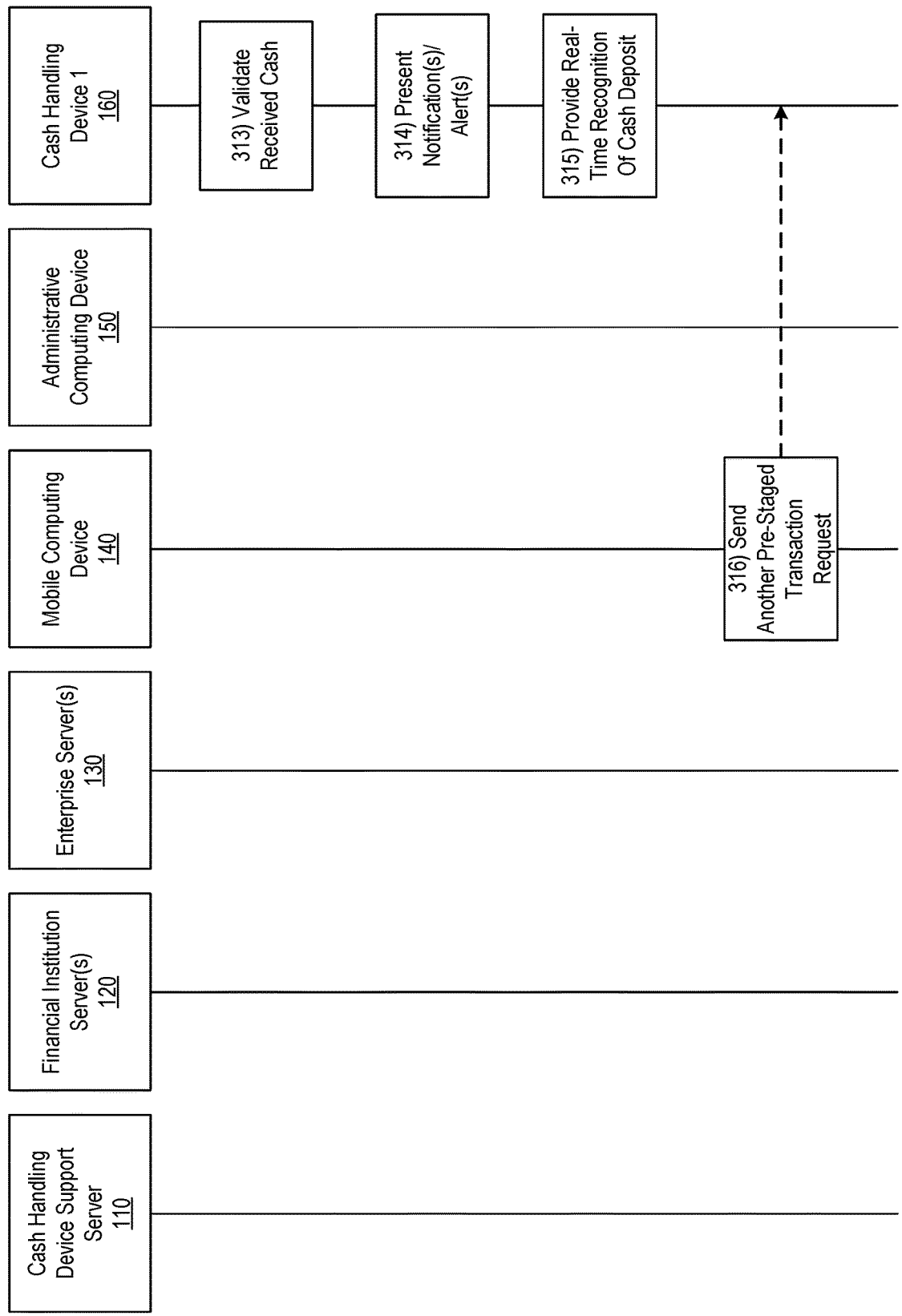
Figure 3E:
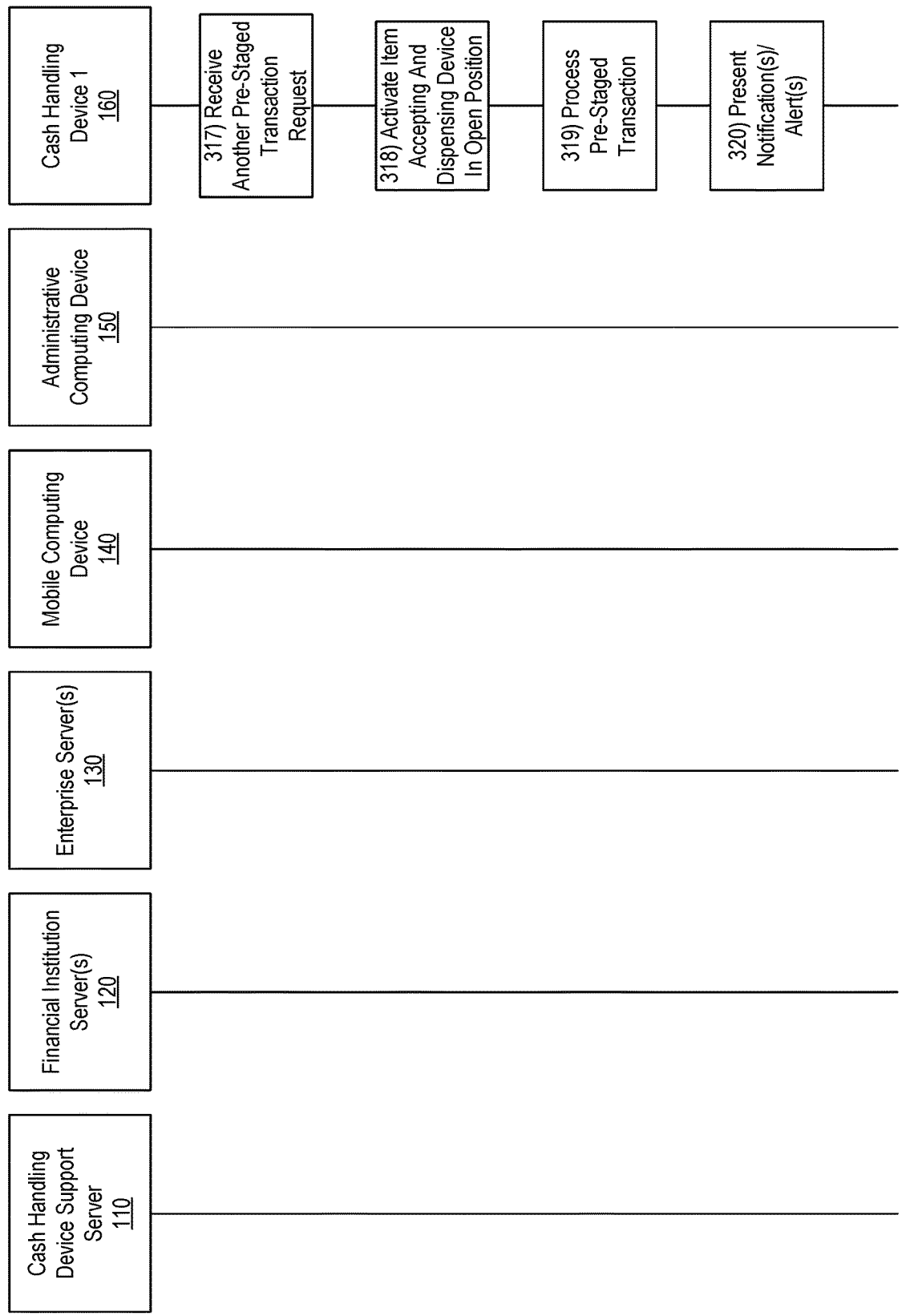

At step 312, cash handling device 160 may receive the cash from the merchant in an amount specified during the pre-staged transaction, via the item accepting and dispensing device, in accordance with the pre-staged transaction. Referring to FIG. 3D, at step 313, cash handling device 160 may validate, at the merchant location and in real-time, the received cash. At step 314, cash handling device 160 may present a notification indicating completed processing of the pre-staged transaction. For example, cash handling device 160 may display and/or otherwise present a graphical user interface similar to graphical user interface 1000, which is illustrated in FIG. 10, as described above.

At step 315, cash handling device 160 may provide real-time recognition of the received cash to an account of the merchant. For example, cash handling device 160 may provide the merchant with immediate access to the cash credited to the account of the merchant. For example, cash handling device 160 may recognize an immediate non-provisional credit of the amount deposited to an account of the merchant with a financial institution (e.g., eliminating the need to take the cash back to a processing center/financial institution and have it counted before the credit may be recognized as a non-provisional credit).

At step 316, the merchant's mobile device (e.g., mobile computing device 140) may send another request to process a subsequent pre-staged transaction (e.g., to withdraw cash from the merchant account). In turn, referring to FIG. 3E, at step 317, cash handling device 160 may receive, via the communication interface, the request to process the subsequent pre-staged transaction. In turn, at step 318, cash handling device 160 may activate the item accepting and dispensing device in an open position to dispense cash from the cash handling device 160 in accordance with the pre-staged transaction.

At step 319, cash handling device 160 may dispense, via the item accepting and dispensing device, in accordance with a cash amount specified by the merchant in the pre-staged transaction. In some examples, in the subsequent withdrawal transaction, cash handling device 160 may dispense the cash received from the merchant at step 311. At step 320, cash handling device 160 may present a notification indicating completed processing of the subsequent pre-staged transaction. In addition, in some instances, one or more steps of the example event sequences may be repeated, skipped, and/or combined.

FIGS. 4A-4D depict another illustrative event sequence for deploying, configuring, and utilizing cash handling devices to provide intelligent monitoring and management of cash cycles in accordance with one or more example embodiments. For example, the example event sequence depicted in FIGS. 4A-4D illustrates how a cash handling device, such as cash handling device 160, may be used to enable enterprise-wide cash position details and analytics. For instance, techniques may be implemented to enable efficiencies in restocking and transportation, enable improvements in management of cash inventories and cash positions (e.g., manage possession of actual physical currency), provide a device-level understanding of an enterprise's cash position, and/or the like.

Figure 4A:
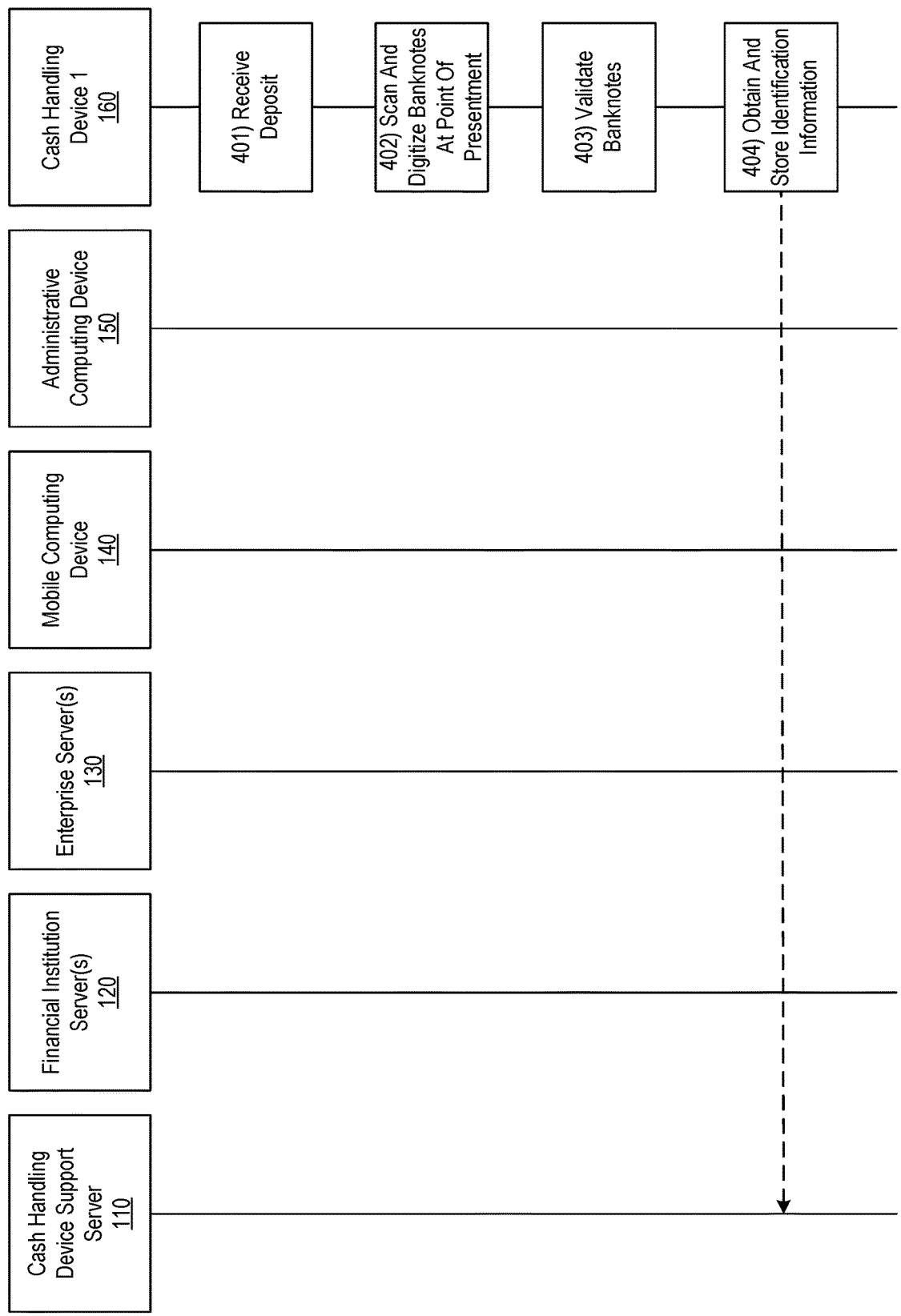

Referring to FIG. 4A, at step 401, cash handling device 160 may receive, via the item accepting and dispensing device, in a deposit transaction, a deposit comprising one or more banknotes.

At step 402, cash handling device 160 may scan and digitize the one or more banknotes at a point of presentment. For example, cash handling device 160 may scan and digitize the one or more banknotes via a scanning unit coupled to an item accepting and dispensing device of cash handling device 160. At step 403, cash handling device 160 may validate the one or more banknotes. In some examples, in validating the one or more banknotes, cash handling device 160 may detect if any of the banknotes deposited include counterfeit currency and, based on detecting the counterfeit currency, generate and send one or more alerts. Validation of the banknotes may include validation using one or more of ultraviolet detection, infrared detection, magnetic detection, image recognition, or text recognition. Such validation may also include comparing the one or more banknotes with stored reference data (e.g., predefined templates of authentic banknotes).

At step 404, cash handling device 160 may process the one or more banknotes. For example, cash handling device 160 may obtain identification information related to each of the one or more banknotes and store the identification information in a datastore (e.g., at cash handling device support server 110). In some examples, in processing the one or more banknotes to obtain identification information related to each of the one or more banknotes, cash handling device 160 may cause cash handling device support server 110 to identify a denomination for each banknote deposited into or dispensed the cash handling device 160, monitor a quantity of banknotes stored in the cash handling device 160 for each denomination, and send one or more alerts when the quantity of banknotes stored in the cash handling device 160 for a denomination is below a predetermined threshold.

Referring to FIG. 4B, in some embodiments, at step 405, cash handling device 160 may cause cash handling device support server 110 to use one or more artificial intelligence algorithms to monitor cash positions across an enterprise. In some examples, cash handling device support server 110 may identify one or more cash transportation needs of cash handling device 160 and automatically schedule servicing (e.g., cash transportation services). At step 406, cash handling device 160 may cause cash handling device support server 110 to generate one or more alerts (e.g., based on identifying the one or more cash transportation or replenishment needs of one or more cash handling devices). At step 407, cash handling device 160 may cause cash handling device support server 110 to send the one or more generated alerts. For example, cash handling device support server 110 may generate and/or send one or more commands and/or alerts to financial institution server 120 and/or administrative computing device 140 based on identifying the cash replenishment needs and/or the cash transportation needs of the cash handling device to direct and/or cause cash replenishment and/or cash transportation to be provided to the one or more cash handling devices (e.g., cash handling device 160, cash handling device 170). Additionally or alternatively, cash handling device support server 110 may generate and/or send one or more commands and/or alerts to one or more operator devices associated with the one or more cash handling devices (e.g., cash handling device 160, cash handling device 170), such as one or more computing devices associated with one or more store owners or other responsible parties for the one or more cash handling devices (e.g., cash handling device 160, cash handling device 170). Additionally or alternatively, cash handling device support server 110 may generate and/or send one or more commands and/or alerts to one or more cash transportation entities requesting and/or directing that the one or more cash handling devices (e.g., cash handling device 150, cash handling device 160) be serviced.

Figure 12:
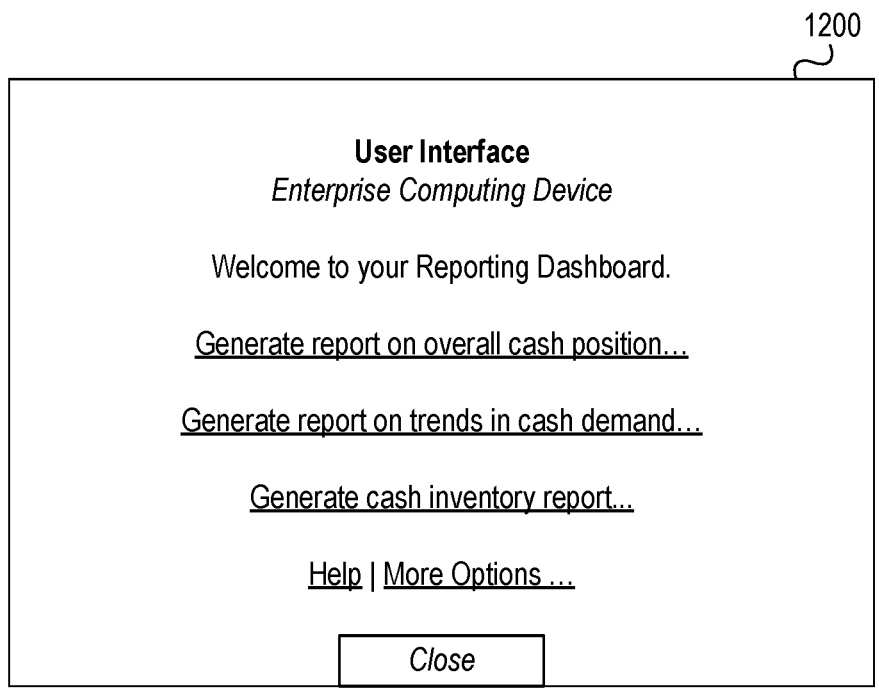

At step 408, cash handling device 160 may cause cash handling device support server 110 to generate one or more reports (e.g., using the identification information related to each of the one or more banknotes). For example, cash handling device support server 110 may generate one or more reports including information indicative of an overall cash position of an enterprise in real-time. In some examples, the one or more reports may include a report on trends in cash demand for an enterprise. In some examples, the one or more reports may include an inventory report that identifies an amount of currency and denominations the currency available to be dispensed at every cash handling device associated with the enterprise. For example, cash handling device 150 may display and/or otherwise present a graphical user interface similar to graphical user interface 1200, which is illustrated in FIG. 12. As seen in FIG. 12, graphical user interface 1200 may include text and/or other information providing a user of a computing device (e.g., administrative computing device 150) a dashboard of reports including reports that identify real-time cash positions of an enterprise, trends in cash demand, cash inventory, and/or the like. It will be appreciated that other and/or different notifications or reports may also be provided.

Figure 4C:
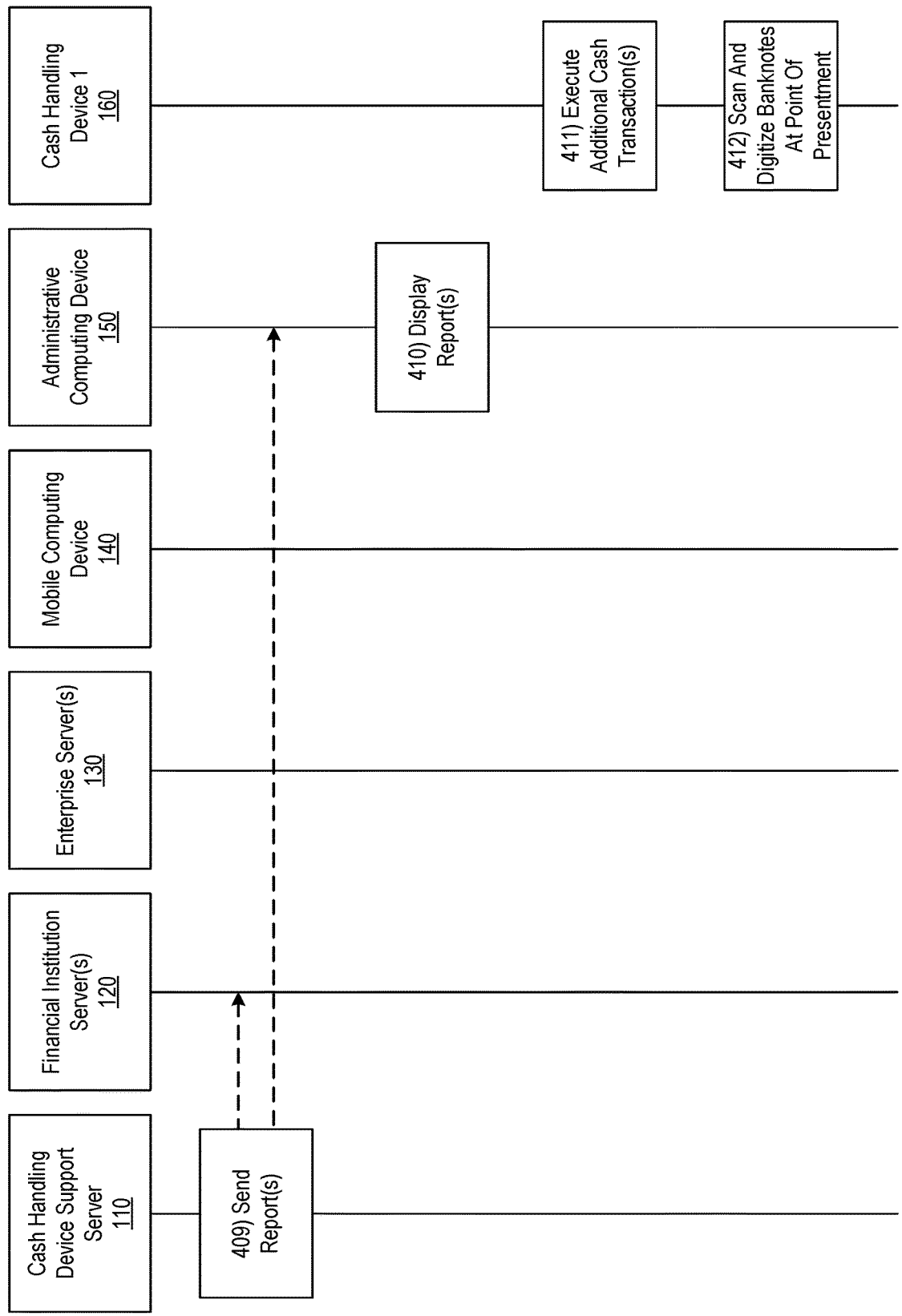

Referring to FIG. 4C, at step 409, cash handling device support server 110 may send the one or more generated reports. For example, cash handling device support server 110 may generate the one or more reports based on a real-time cash position of a first cash handling device associated with the enterprise at a first location, and a real-time cash position of one or more additional cash handling devices associated with the enterprise at one or more additional locations. At step 410, cash handling device 160 may cause cash handling device support server 110 to send one or more commands to a user computing device (e.g., administrative computing device 150) to display the one or more reports (e.g., on a user interface).

Figure 4D:
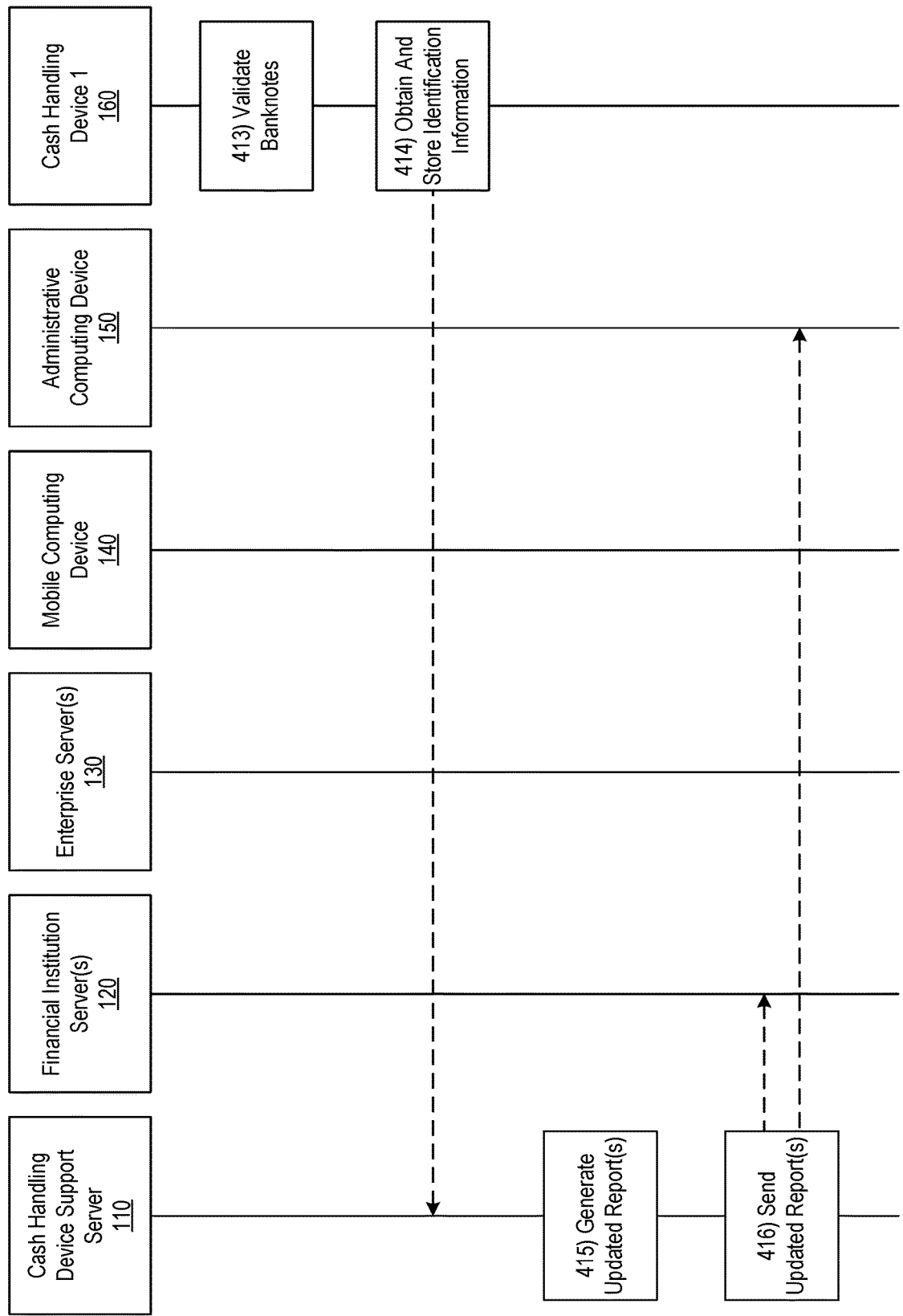

Referring to FIGS. 4C-4D, at steps 411-414, cash handling device 160 may repeat steps 401-404 (e.g., in FIG. 4A) for performing one or more additional cash transactions. Referring to FIG. 4D, at step 415, cash handling device 160 may cause cash handling device support server 110 to generate one or more updated reports (e.g., dynamically updating the generated one or more reports based on additional data generated during execution of the one or more additional cash transactions). For example, cash handling device support server may generate one or more updated reports including information indicative of an overall cash position of an enterprise in real-time. In some examples, the one or more reports may include an updated report on trends in cash demand for an enterprise. In some examples, the one or more updated reports may include an inventory report that identifies an amount of currency and denominations the currency available to be dispensed at every cash handling device associated with the enterprise. At step 416, cash handling device support server 110 may send the one or more generated updated reports (e.g., for display on a user interface).

Figure 13:
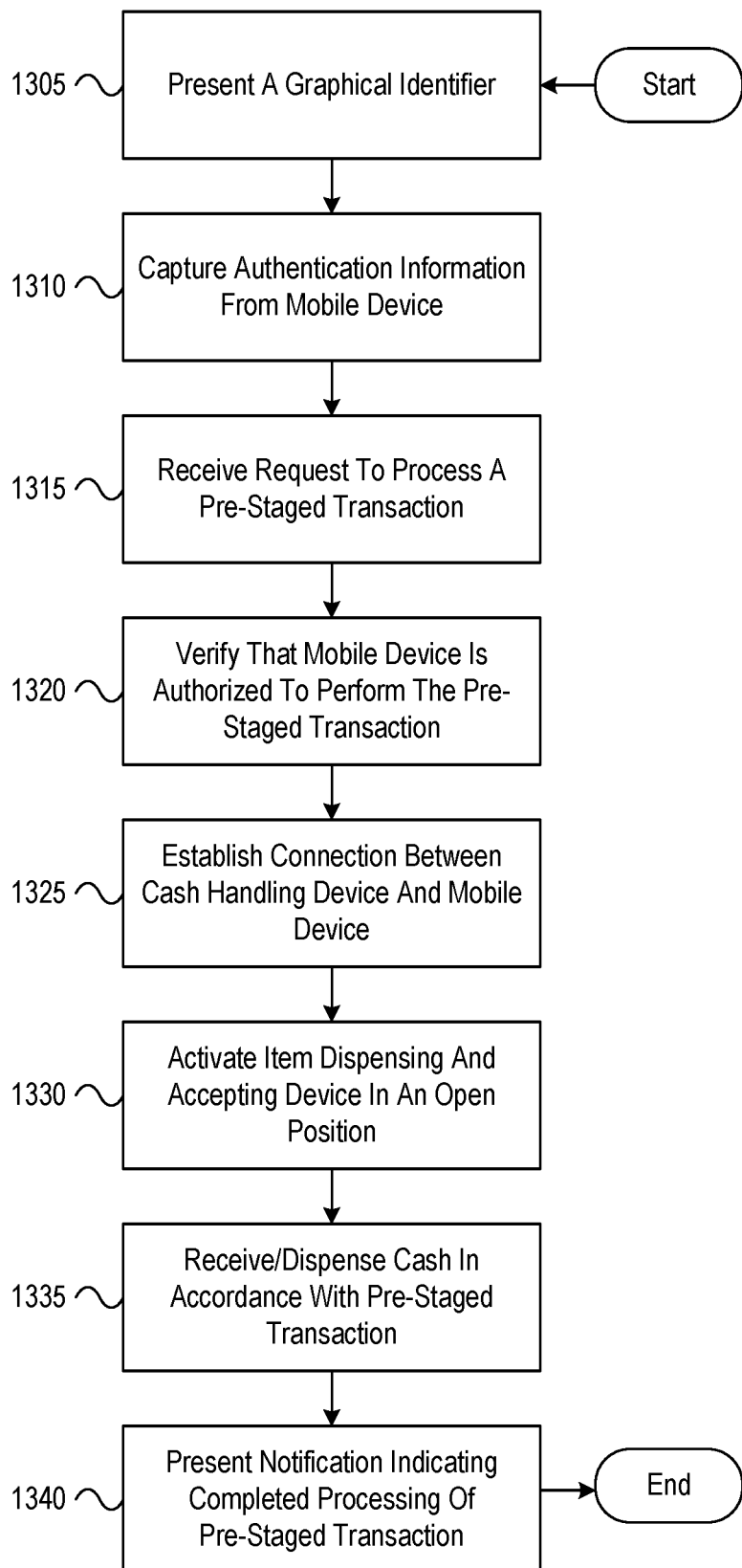
FIGS. 13-15 depict illustrative methods for deploying, configuring, and utilizing cash handling devices to provide intelligent monitoring and management of cash cycles in accordance with one or more example embodiments.

FIG. 13 depicts an illustrative method for deploying, configuring, and utilizing cash handling devices to provide intelligent monitoring and management of cash cycles in accordance with one or more example embodiments. Referring to FIG. 13, at step 1305, a cash handling device having at least one processor, a communication interface, a small screen display, an item accepting and dispensing device, and memory may present a graphical identifier on the small screen display. At step 1310, based on the graphical identifier being scanned by a mobile device, the cash handling device may capture authentication information. At step 1315, the cash handling device may receive, via the communication interface, from the mobile device, a request to process a pre-staged transaction. At step 1320, the cash handling device may verify that the mobile device is authorized to perform the pre-staged transaction based on the captured authentication information. After verifying that the mobile device is authorized to perform the pre-staged transaction based on the captured authentication information, the cash handling device may, at step 1325, cause a connection to be established between the cash handling device and the mobile device, and at step 1330, activate the item accepting and dispensing device in an open position to accept or dispense cash in accordance with the pre-staged transaction. At step 1335, the cash handling device may receive or dispense cash, via the item accepting and dispensing device, in accordance with the pre-staged transaction. At step 1340, the cash handling device may present a notification indicating completed processing of the pre-staged transaction.

Figure 14:
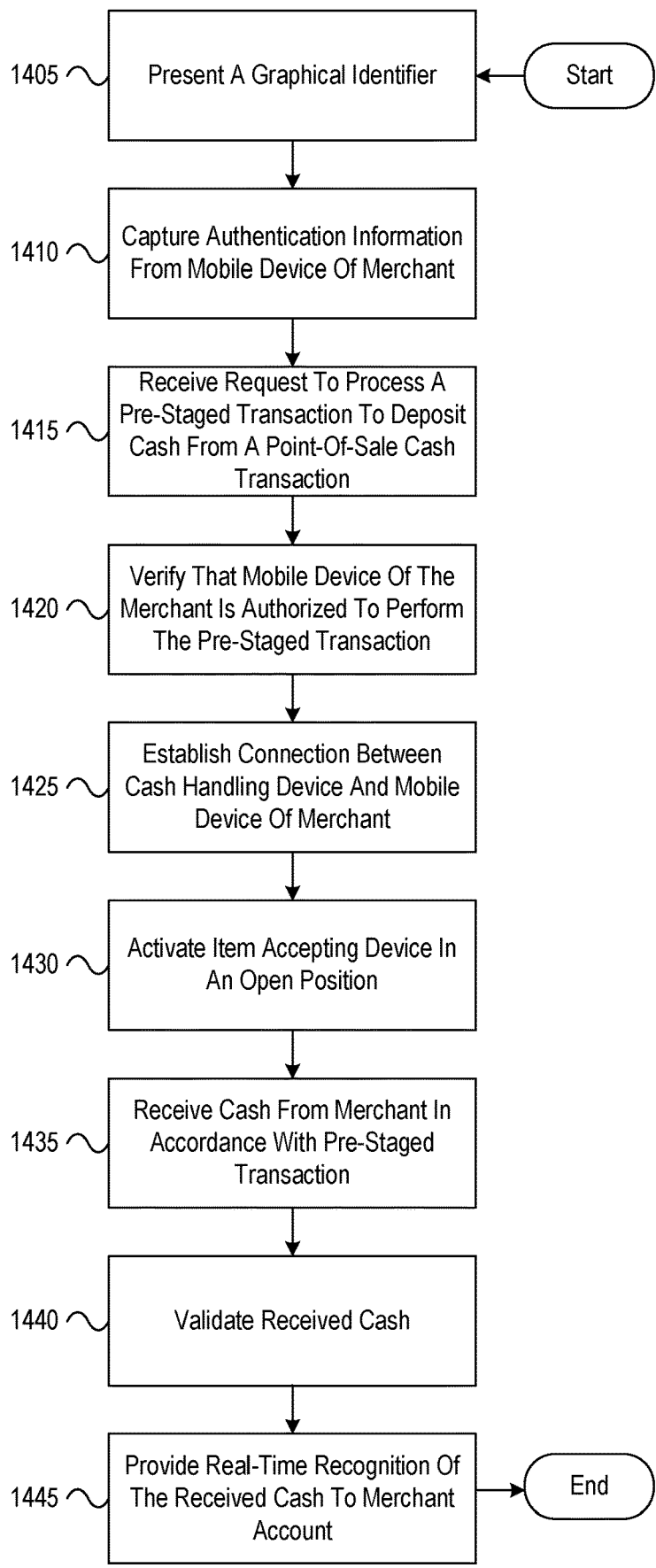

FIG. 14 depicts an illustrative method for deploying, configuring, and utilizing cash handling devices to provide intelligent monitoring and management of cash cycles in accordance with one or more example embodiments. Referring to FIG. 14, at step 1405, a cash handling device having at least one processor, a communication interface, a small screen display, an item accepting and dispensing device, and memory may present a graphical identifier on the small screen display. At step 1410, based on the graphical identifier being scanned by a mobile device of a merchant, the cash handling device may capture authentication information. At step 1415, the cash handling device may receive, via a communication interface, from the mobile device of the merchant, a request to process a pre-staged transaction to deposit cash designated as payment to the merchant from a transaction at the point-of-sale terminal. At step 1420, the cash handling device may verify that the mobile device of the merchant is authorized to perform the pre-staged transaction based on the captured authentication information. After verifying that the mobile device of the merchant is authorized to perform the pre-staged transaction based on the captured authentication information, the cash handling device may, at step 1425, cause a connection to be established between the cash handling device and the mobile device of the merchant, and at step 1430, activate the item accepting device in an open position to accept cash for deposit into the cash handling device. At step 1435, the cash handling device may receive cash from the merchant in an amount specified during the pre-staged transaction. At step 1440, the cash handling device may validate, at the merchant location and in real-time, the received cash. At step 1445, the cash handling device may provide real-time recognition of the received cash to an account of the merchant.

Figure 15:
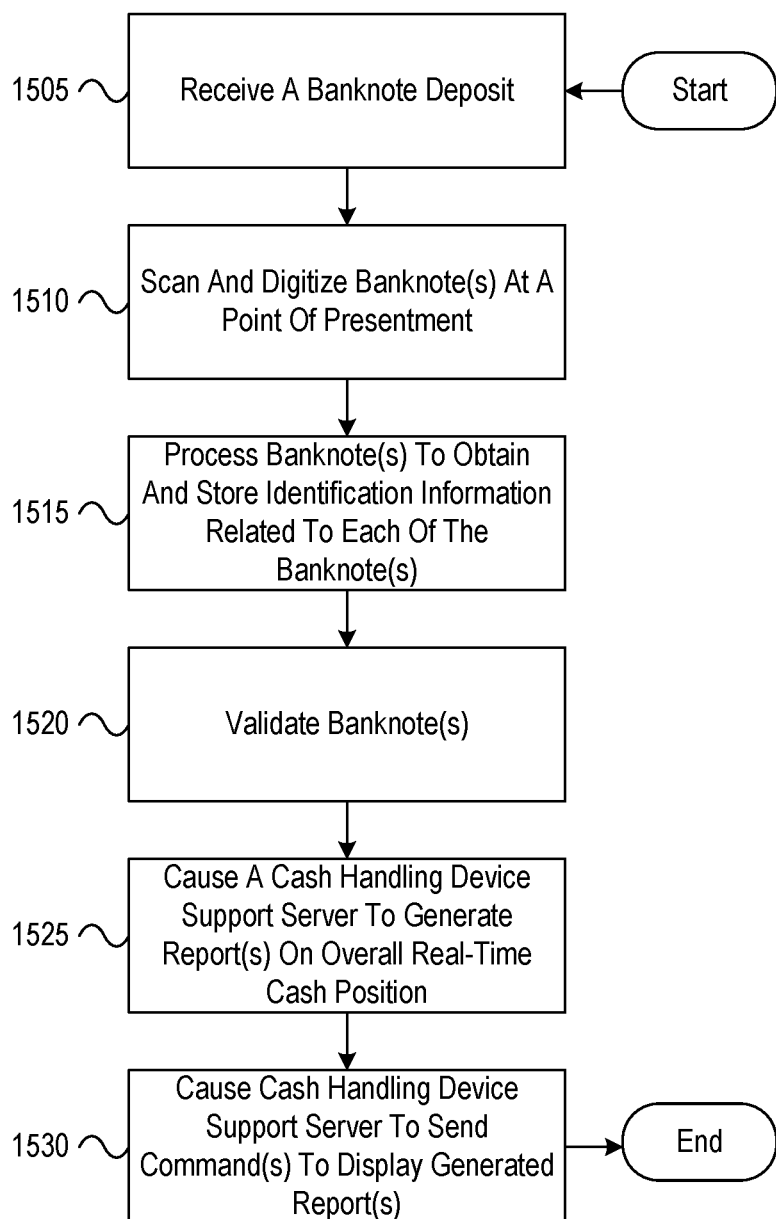

FIG. 15 depicts an illustrative method for deploying, configuring, and utilizing cash handling devices to provide intelligent monitoring and management of cash cycles in accordance with one or more example embodiments. Referring to FIG. 15, at step 1505, a cash handling device having at least one processor, a communication interface, a small screen display, an item accepting and dispensing device, and memory may receive, via the item accepting and dispensing device, a deposit that includes one or more banknotes. At step 1510, the cash handling device may scan and digitize, via a scanning unit coupled to the item accepting and dispensing device, the one or more banknotes at a point of presentment. At step 1515, the cash handling device may process the one or more banknotes to obtain and store, in a datastore, identification information related to each of the one or more banknotes. At step 1520, the cash handling device may validate the one or more banknotes. At step 1525, the cash handling device may cause a cash handling device support server to generate, using the identification information related to each of the one or more banknotes, one or more reports that include information indicative of an overall cash position of an enterprise in real-time. At step 1530, the cash handling device may cause the cash handling device support server to send one or more commands to a user computing device to display the one or more reports.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
a point-of-sale (POS) terminal at a merchant location of a merchant;
a mobile device of a merchant; and
a cash handling device, at the merchant location of the merchant, integrated with the point-of-sale terminal and configured to communicate with the point-of-sale terminal,
wherein the cash handling device comprises a memory storing computer-readable instructions that, when executed by at least one processor of the cash handling device, cause the cash handling device to:
present, on a small screen display, a graphical identifier;
based on the graphical identifier being scanned by the mobile device of the merchant, capture authentication information;
receive, via a communication interface, from the mobile device of the merchant, a request to process a pre-staged transaction to deposit cash designated as payment to the merchant from a transaction at the point-of-sale terminal;
verify that the mobile device of the merchant is authorized to perform the pre-staged transaction based on the captured authentication information;
after verifying that the mobile device of the merchant is authorized to perform the pre-staged transaction based on the captured authentication information, cause a connection to be established between the cash handling device and the mobile device of the merchant, and activate an item accepting device in an open position to accept cash for deposit into the cash handling device;

receive cash from the merchant in an amount specified during the pre-staged transaction;

validate, at the merchant location and in real-time, the received cash; and provide real-time recognition of the received cash to an account of the merchant.

2. The system of claim 1, wherein providing real-time recognition of the received cash to the account of the merchant comprises providing the merchant with immediate access to the cash credited to the account of the merchant.

3. The system of claim 1, wherein providing real-time recognition of the received cash to the account of the merchant comprises recognizing an immediate non-provisional credit of the amount deposited to an account of the merchant with a financial institution.

4. The system of claim 1, wherein the cash handling device comprises a memory storing additional computer-readable instructions that, when executed by the at least one processor of the cash handling device, cause the cash handling device to:

in a subsequent withdrawal transaction, dispense the cash received from the merchant.

5. The system of claim 1, wherein presenting the graphical identifier comprises presenting a quick response (QR) code, wherein the QR code is used for a transaction between the mobile device of the merchant and the cash handling device.

6. The system of claim 1, wherein verifying that the mobile device of the merchant is authorized to perform the pre-staged transaction based on the captured authentication information comprises verification using mobile authentication.

7. The system of claim 1, wherein receiving the request to process the pre-staged transaction comprises receiving the request from a smartphone, associated with the merchant, executing an application associated with a financial institution.

8. The system of claim 1, wherein capturing the authentication information based on the graphical identifier being scanned by the mobile device of the merchant comprises identifying the merchant associated with the pre-staged transaction.

9. The system of claim 1, wherein the cash handling device comprises a memory storing additional computer-readable instructions that, when executed by the at least one processor of the cash handling device, cause the cash handling device to:

verify that the mobile device of the merchant is authorized to perform the pre-staged transaction based on additional authentication mechanisms including one or more of: one-time password, proximity-based authentication, or multifactor authentication.

10. A method comprising:

at a cash handling device, at a merchant location of a merchant and integrated with a point-of-sale terminal, comprising at least one processor, a communication interface, a small screen display, an item accepting device, and memory:

presenting, by the at least one processor, on the small screen display, a graphical identifier;

based on the graphical identifier being scanned by a mobile device of a merchant, capturing, by the at least one processor, authentication information;

receiving, by the at least one processor, via a communication interface, from the mobile device of the merchant, a request to process a pre-staged transaction to deposit cash designated as payment to the merchant from a transaction at the point-of-sale terminal;

verifying, by the at least one processor, that the mobile device of the merchant is authorized to perform the pre-staged transaction based on the captured authentication information;

after verifying that the mobile device of the merchant is authorized to perform the pre-staged transaction based on the captured authentication information, causing, by the at least one processor, a connection to be established between the cash handling device and the mobile device of the merchant, and activating, by the at least one processor, the item accepting device in an open position to accept cash for deposit into the cash handling device;

receiving, by the at least one processor, cash from the merchant in an amount specified during the pre-staged transaction;

validating, by the at least one processor, at the merchant location and in real-time, the received cash; and providing, by the at least one processor, real-time recognition of the received cash to an account of the merchant.

11. The method of claim 10, wherein providing real-time recognition of the received cash to the account of the merchant comprises providing the merchant with immediate access to the cash credited to the account of the merchant.

12. The method of claim 10, wherein providing real-time recognition of the received cash to the account of the merchant comprises recognizing an immediate non-provisional credit of the amount deposited to an account of the merchant with a financial institution.

13. The method of claim 10, further comprising:

in a subsequent withdrawal transaction, dispensing the cash received from the merchant.

14. The method of claim 10, wherein presenting the graphical identifier comprises presenting a quick response (QR) code, wherein the QR code is used for a transaction between the mobile device of the merchant and the cash handling device.

15. The method of claim 10, wherein verifying that the mobile device of the merchant is authorized to perform the pre-staged transaction based on the captured authentication information comprises verification using mobile authentication.

16. The method of claim 10, wherein receiving the request to process the pre-staged transaction comprises receiving the request from a smartphone, associated with the merchant, executing an application associated with a financial institution.

17. The method of claim 10, wherein capturing the authentication information based on the graphical identifier being scanned by the mobile device of the merchant comprises identifying the merchant associated with the pre-staged transaction.

18. The method of claim 10, further comprising:

verifying that the mobile device of the merchant is authorized to perform the pre-staged transaction based on additional authentication mechanisms including one or more of: one-time password, proximity-based authentication, or multifactor authentication.

19. One or more non-transitory computer-readable media storing instructions that, when executed by a cash handling device, at a merchant location of a merchant and integrated with a point-of-sale terminal, comprising at least one processor, a communication interface, a small screen display, an item accepting device, and memory, cause the cash handling device to:

present, on the small screen display, a graphical identifier;

based on the graphical identifier being scanned by a mobile device of a merchant, capture authentication information;

receive, via a communication interface, from the mobile device of the merchant, a request to process a pre-staged transaction to deposit cash designated as payment to the merchant from a transaction at the point-of-sale terminal;

verify that the mobile device of the merchant is authorized to perform the pre-staged transaction based on the captured authentication information;

after verifying that the mobile device of the merchant is authorized to perform the pre-staged transaction based on the captured authentication information, cause a connection to be established between the cash handling device and the mobile device of the merchant, and activate the item accepting device in an open position to accept cash for deposit into the cash handling device;

receive cash from the merchant in an amount specified during the pre-staged transaction;

validate, at the merchant location and in real-time, the received cash; and provide real-time recognition of the received cash to an account of the merchant.

20. The one or more non-transitory computer-readable media of claim 19, wherein verifying that the mobile device of the merchant is authorized to perform the pre-staged transaction based on the captured authentication information comprises verification using mobile authentication.

\* \* \* \* \*